US012795581B2

(12) United States Patent
Si et al.

(10) Patent No.: US 12,795,581 B2
(45) Date of Patent: Nov. 10, 2026

(54) MEASUREMENT GAP CONFIGURATION REQUEST METHOD AND APPARATUS, TERMINAL, AND NETWORK-SIDE DEVICE

(71) Applicant: VIVO MOBILE COMMUNICATION CO., LTD., Dongguan (CN)

(72) Inventors: Ye Si, Dongguan (CN); Huaming Wu, Dongguan (CN); Yuanyuan Wang, Dongguan (CN); Yuanyuan Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 661 days.

(21) Appl. No.: 18/094,337

(22) Filed: Jan. 6, 2023

(65) Prior Publication Data

US 2023/0164612 A1 May 25, 2023

Related U.S. Application Data

(63) Continuation of application No. PCT/CN2021/104513, filed on Jul. 5, 2021.

(30) Foreign Application Priority Data

Jul. 6, 2020 (CN) ......................... 202010642004.5

(51) Int. Cl.
*H04W 64/00* (2009.01)
*H04L 5/00* (2006.01)
(Continued)

(52) U.S. Cl.
CPC ........... *H04W 64/00* (2013.01); *H04L 5/0051* (2013.01); *H04W 24/10* (2013.01); *H04W 72/044* (2013.01)

(58) Field of Classification Search
CPC ... H04W 64/00; H04W 24/10; H04W 72/044; H04W 24/02; H04L 5/0051; H04L 5/001;
(Continued)

(56) References Cited

U.S. PATENT DOCUMENTS

2013/0267246 A1* 10/2013 Wang .................... H04W 24/00 455/456.1
2019/0052996 A1 2/2019 Sahai et al.
(Continued)

FOREIGN PATENT DOCUMENTS

CN 102457960 A 5/2012
CN 103039108 A 4/2013
(Continued)

OTHER PUBLICATIONS

First Office Action issued in related Chinese Application No. 202010642004.5, mailed Jul. 2, 2024, 11 pages.
(Continued)

*Primary Examiner* — Justin T Van Roie
(74) *Attorney, Agent, or Firm* — IPX PLLC

(57) ABSTRACT

Measurement gap configuration request methods performed by a base station, a location server, and a terminal are provided. The measurement gap configuration request method includes: receiving, by a base station, a measurement gap request sent by a terminal or a location server; and performing at least one of the following according to the measurement gap request: configuring a measurement gap for measurement on a downlink positioning reference signal, or sending feedback information to the terminal or the location server, where the feedback information is used to indicate whether the base station configures the measurement gap for measurement on the downlink positioning reference signal.

16 Claims, 14 Drawing Sheets

(51) Int. Cl.
*H04W 24/10* (2009.01)
*H04W 72/044* (2023.01)

(58) Field of Classification Search
CPC ... H04L 5/0069; H04L 5/0094; H04L 5/0098; H04L 5/0048; G01S 5/0205
See application file for complete search history.

(56) References Cited

U.S. PATENT DOCUMENTS

| | | | | |
|---|---|---|---|---|
| 2019/0239106 | A1 | 8/2019 | Cui et al. | |
| 2023/0038050 | A1* | 2/2023 | Si ...................... | H04W 36/0088 |

FOREIGN PATENT DOCUMENTS

| | | | |
|---|---|---|---|
| CN | 104956745 | A | 9/2015 |
| CN | 109788497 | A | 5/2019 |
| CN | 110012498 | A | 7/2019 |
| CN | 110651512 | A | 1/2020 |
| CN | 110958685 | A | 4/2020 |
| CN | 111342943 | A | 6/2020 |
| WO | 2015199392 | A1 | 12/2015 |
| WO | 2019054749 | A1 | 3/2019 |
| WO | 2020026211 | A1 | 2/2020 |
| WO | 2020060118 | A1 | 3/2020 |

OTHER PUBLICATIONS

Extended European Search Report issued in related European Application No. 21837361.1, mailed Dec. 8, 2023, 14 pages.

International Search Report issued in corresponding International Application No. PCT/CN2021/104513, mailed Sep. 15, 2021, 5 pages.

Second Office Action issued in related Chinese Application No. 202010642004.5, mailed Mar. 4, 2025, 6 pages.

Third Office Action issued in related Chinese Application No. 202010642004.5, mailed Apr. 25, 2025, 9 pages.

"LMF in NG-RAN", 3GPP tsg_ran\wg3_iu, R3-193946, Aug. 2019, 4 pages.

* cited by examiner

MEASUREMENT GAP CONFIGURATION REQUEST METHOD AND APPARATUS, TERMINAL, AND NETWORK-SIDE DEVICE

CROSS-REFERENCE TO RELATED APPLICATIONS

This application is a continuation of International Application No. PCT/CN2021/104513, filed Jul. 5, 2021, which claims priority to Chinese Patent Application No. 202010642004.5, filed Jul. 6, 2020. The entire contents of each of the above-referenced applications are expressly incorporated herein by reference.

TECHNICAL FIELD

This application pertains to the field of wireless communications technologies, and relates to a measurement gap configuration request method and apparatus, a terminal, and a network-side device.

BACKGROUND

In a New Radio (NR) communications system, using NR positioning as an example, Positioning Reference Signal (PRS) is introduced for User Equipment (UE) to perform a positioning measurement. In an actual measurement process, the UE needs to perform measurement on PRSs sent by a plurality of cells in broadcast mode. However, to ensure a high-accuracy positioning measurement, a network-side device configures a PRS with a large bandwidth, which sometimes exceeds a range of active Bandwidth Part (BWP) on which the UE is operating. Therefore, in order for the UE to perform measurement on a PRS outside the active BWP, the NR communications system allows the UE to use a measurement gap to perform measurement on the PRS outside the active BWP.

When the UE expects to perform measurement on the PRS outside the active BWP or a PRS different from that in an active BWP parameter set (numerology), the UE may send a measurement gap request to a base station (gNB) to request the base station to configure a measurement gap for the UE. The base station may determine, based on its own situation, whether to configure the measurement gap for the UE.

However, in the related art, it is a behavior of the base station to determine whether to configure the measurement gap for the UE. The UE does not know whether the measurement gap is configured by the base station, and therefore cannot determine a bandwidth for measurement on the PRS.

SUMMARY

An objective of embodiments of this application is to provide a measurement gap configuration request method and apparatus, a terminal, and a network-side device.

According to a first aspect, a measurement gap configuration request method is provided and is applied to a base station, where the method includes: receiving a measurement gap request sent by a terminal and/or a location server; and performing at least one of the following according to the measurement gap request: configuring a measurement gap for measurement on a downlink positioning reference signal, or sending feedback information to the terminal and/or the location server, where the feedback information is used to indicate whether the base station configures the measurement gap for measurement on the downlink positioning reference signal.

According to a second aspect, a measurement gap configuration request method is provided and is applied to a location server, where the method includes: sending preset signaling to a terminal, where the preset signaling includes at least part of information in current downlink positioning reference signal configuration information; and sending a measurement gap request to a base station serving the terminal, where the measurement gap request is used to indicate the base station to configure a measurement gap for measurement on a downlink positioning reference signal.

According to a third aspect, a measurement method is provided and is applied to a terminal, where the method includes: receiving preset signaling sent by a location server, where the preset signaling includes at least part of information in current downlink positioning reference signal configuration information; sending a measurement gap request to a base station according to the preset signaling, where the measurement gap request is used to indicate the base station to configure a measurement gap for measurement on a downlink positioning reference signal; and performing measurement on the downlink positioning reference signal according to whether the measurement gap is configured and/or the preset signaling.

According to a fourth aspect, a measurement gap configuration request apparatus is provided and is located in a base station, where the apparatus includes: a first receiving module, configured to receive a measurement gap request sent by a terminal and/or a location server; and a first processing module, configured to perform at least one of the following according to the measurement gap request: configuring a measurement gap for measurement on a downlink positioning reference signal, or sending feedback information to the terminal and/or the location server, where the feedback information is used to indicate whether the base station configures the measurement gap for measurement on the downlink positioning reference signal.

According to a fifth aspect, a measurement gap request apparatus is provided, where the apparatus includes: a first sending module, configured to send preset signaling to a terminal, where the preset signaling includes at least part of information in current downlink positioning reference signal configuration information; and a second sending module, configured to send a measurement gap request to a base station serving the terminal, where the measurement gap request is used to indicate the base station to configure a measurement gap for measurement on a downlink positioning reference signal.

According to a sixth aspect, a measurement apparatus is provided, where the apparatus includes: a fourth receiving module, configured to receive preset signaling sent by a location server, where the preset signaling includes at least part of information in current downlink positioning reference signal configuration information; a third sending module, configured to send a measurement gap request to a base station according to the preset signaling, where the measurement gap request is used to indicate the base station to configure a measurement gap for measurement on a downlink positioning reference signal; and a measurement module, configured to perform measurement on the downlink positioning reference signal according to whether the measurement gap is configured and/or the preset signaling.

According to a seventh aspect, a network-side device is provided and includes a processor, a memory, and a program or instructions stored in the memory and capable of running on the processor, where when the program or instructions are executed by the processor, the steps of the measurement gap configuration request method according to the first aspect are implemented, or when the program or instructions are executed by the processor, the steps of the measurement gap configuration request method according to the second aspect are implemented.

According to an eighth aspect, a terminal is provided and includes a processor, a memory, and a program or instructions stored in the memory and capable of running on the processor, where when the program or instructions are executed by the processor, the steps of the measurement method according to the third aspect are implemented.

According to a ninth aspect, a readable storage medium is provided, where the readable storage medium stores a program or instructions, and when the program or instructions are executed by a processor, the measurement gap configuration request method according to the first aspect is implemented, or the steps of the measurement gap configuration request method according to the second aspect are implemented, or the steps of the measurement method according to the third aspect are implemented.

According to a tenth aspect, a chip is provided, where the chip includes a processor and a communications interface, where the communications interface is coupled to the processor, and the processor is configured to run a program or instructions to implement the method according to the first aspect, or implement the method according to the second aspect, or implement the method according to the third aspect.

In the embodiments of this application, the base station receives the measurement gap request sent by the terminal and/or the location server, where the measurement gap request is used to indicate the base station to feed back to the terminal and/or the location server whether the measurement gap for measurement on the downlink positioning reference signal can be configured; and/or the base station sends the feedback information to the terminal and/or the location server, where the feedback information indicates whether the base station configures the measurement gap, so that the UE can know whether the base station configures the measurement gap and further perform measurement on the positioning reference signal within a corresponding bandwidth.

DETAILED DESCRIPTION

The following clearly describes the technical solutions in the embodiments of this application with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that data used in this way is interchangeable in appropriate circumstances so that the embodiments of this application can be implemented in other orders than the order illustrated or described herein. Moreover, the term "first" or "second" usually distinguishes a type of object and does not limit an object quantity. For example, there may be one first object or a plurality of first objects. In addition, in this specification and claims, "and/or" indicates at least one of connected objects, and the character "/" generally indicates an "or" relationship between associated objects.

It should be noted that the technologies described in the embodiments of this application are not limited to Long Term Evolution (LTE)/LTE-Advanced (LTE-A) systems, and may also be used in other wireless communications systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" in the embodiments of this application are often used interchangeably, and the technologies described herein may be used in the above-mentioned systems and radio technologies as well as other systems and radio technologies. However, in the following descriptions, a New Radio (NR) system is described for an illustrative purpose, and NR terms are used in most of the following descriptions, although these technologies may also be applied to other applications than an NR system application, for example, a 6th Generation (6G) communications system.

Figure 1:
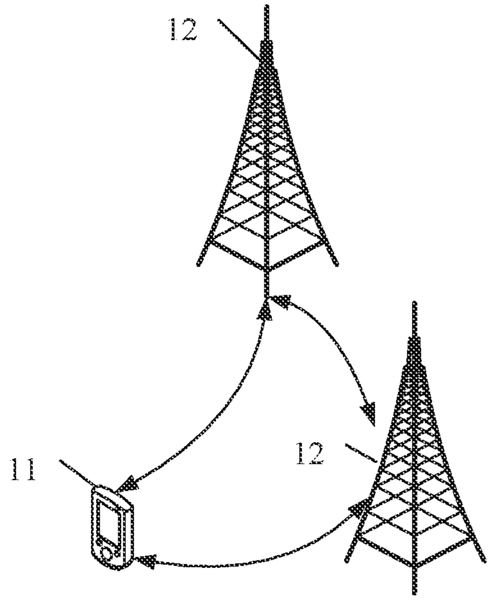
FIG. 1 is a schematic diagram of a structure of a communications system according to an exemplary embodiment of this application.

FIG. 1 is a block diagram of a wireless communications system to which an embodiment of this application may be applied. The wireless communications system includes a terminal 11 and a network-side device 12. The terminal 11 may also be referred to as a terminal device or a user terminal. The terminal 11 may be a terminal-side device such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device, a vehicular device (VUE), or a pedestrian terminal (PUE). The wearable device includes a hand ring, an earphone, glasses, or the like. It should be noted that a specific type of the terminal 11 is not limited in the embodiments of this application.

The network-side device 12 may be a base station, a core network, a positioning server, or the like. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a Wi-Fi node, a Transmitting Receiving Point (TRP), or another appropriate term in the art. As long as the same technical effect is achieved, the base station is not limited to specific technical terms. It should be noted that in the embodiments of this application, only a base station gNB in an NR system is used as an example, but a specific type of the base station is not limited. For example, the base station gNB may be represented as a serving cell.

The technical solutions provided in the embodiments of this application are hereinafter described in detail by using specific embodiments and application scenarios thereof with reference to the accompanying drawings.

Figure 2:
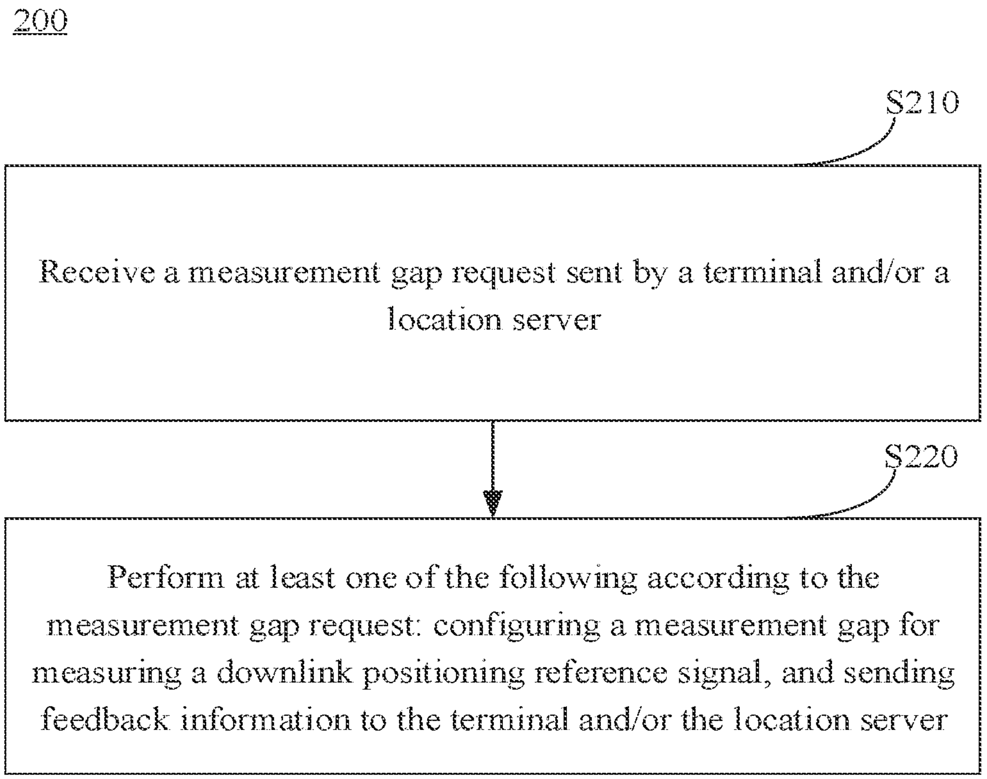
FIG. 2 is a schematic flowchart of a measurement gap configuration request method applied to a base station according to an exemplary embodiment of this application.

FIG. 2 is a schematic flowchart of a measurement gap configuration request method 200 according to an exemplary embodiment of this application. The method 200 may be applied to a base station, and may be performed by hardware or software in the base station. Referring to FIG. 2 again, the method 200 may include at least the following steps.

S210. Receive a measurement gap request sent by a terminal and/or a location server.

The measurement gap request is used to indicate the base station to configure a measurement gap for measurement on a downlink positioning reference signal.

In some embodiments, the downlink positioning reference signal includes but is not limited to at least one of signals such as a PRS, a Synchronization Signal and PBCH block (SSB), a Tracking Reference Signal (TRS), or a CSI Reference Signal (CSI-RS).

In addition, the downlink positioning reference signal measurement may be a conventional measurement, or may be an on-demand measurement. Correspondingly, a downlink positioning reference signal configuration mentioned in the subsequent embodiment may be a conventional configuration or an on-demand configuration; a positioning base station participating in a positioning measurement may be a base station participating in positioning in conventional positioning, or may be a base station participating in positioning in on-demand positioning; and the location server may be a network node/device that determines a conventional downlink positioning reference signal configuration, or may be a network node/device that determines an on-demand downlink positioning reference signal configuration. This is not limited in this embodiment.

In an actual application, the location server may directly or indirectly send the measurement gap request to the base station. For example, the location server may directly transmit the measurement gap request to the base station by using only one piece of signaling, such as signaling LPPa. For another example, the location server may transmit the measurement gap request to the base station by using a plurality of pieces of signaling between a plurality of nodes. For example, the location server may first send the measurement gap request to the terminal, and then the terminal forwards the measurement gap request to the base station. This is not limited in this embodiment. Correspondingly, when the base station sends feedback information described in S220 to the location server, the feedback information may also be sent directly or indirectly. For details, refer to the process of sending the measurement gap request to the base station by the location server.

It may be understood that, in the embodiments provided in this application, the location server is a network node that determines the downlink positioning reference signal configuration, and the base station is a base station that currently provides a service for the terminal. In addition, the measurement gap request sent by the terminal and received by the base station in S210 may be sent by the terminal autonomously, or may be a forwarded measurement gap request corresponding to the location server. This is not limited in this embodiment.

S220. Perform at least one of the following according to the measurement gap request: configuring a measurement gap for measurement on a downlink positioning reference signal, or sending feedback information to the terminal and/or the location server.

The feedback information is used to indicate whether the base station configures the measurement gap for measurement on the downlink positioning reference signal. In an actual application, if the base station configures the measurement gap, the base station may send the measurement gap configuration to the terminal and/or the location server after configuring the measurement gap, so that the terminal can perform measurement on the positioning reference signal based on the measurement gap, or the location server confirms, based on the feedback, that the positioning reference signal configuration does not need to be adjusted, to perform a next positioning step. The base station may further determine, based on an actual requirement, whether to send to the terminal and/or the location server the feedback information for indicating that the base station configures the measurement gap. For example, if configuring the measurement gap is supported, the base station does not feed back information, but implicitly indicates that the measurement gap is supported or configured.

In an actual application, the base station may configure the measurement gap after sending the feedback information; or configure the measurement gap after a start time of the measurement gap indicated by the measurement gap request. The measurement gap may be set based on an actual requirement.

After configuring the measurement gap, the base station stops the measurement gap when a predetermined condition is met, where the predetermined condition may include at least one of the following (1) to (3).

(1) Measurement gap stop signaling is received. The measurement gap stop signaling may be sent by the terminal or the location server or another network node.

(2) In a case that the measurement gap request includes effective duration of the measurement gap, a current effective time of the measurement gap reaches the effective duration of the gap.

(3) In a case that the measurement gap request includes an end time of the measurement gap, the current time reaches the end time of the measurement gap.

In this application, the measurement gap request may indicate the base station to feed back to the terminal and/or the location server whether the measurement gap for measurement on the downlink positioning reference signal can be configured, so that when the base station determines, based on its own situation, whether to configure the measurement gap, the base station can feed back whether to configure the measurement gap.

In some embodiments, the terminal and/or the location server may not require, by using the measurement gap request, the base station to feed back whether the measurement gap is configurable, but the base station actively feeds back whether the measurement gap is configured.

If the base station feeds back to the terminal whether the measurement gap is configurable, the terminal may determine, according to the feedback, whether to perform measurement on the downlink positioning reference signal in an active DL BWP or perform measurement on the downlink positioning reference signal in the measurement gap. If the base station feeds back to the location server whether the measurement gap is configurable, the location server may determine the downlink positioning reference signal configuration such as a bandwidth according to the feedback, and then notify other positioning base stations participating in the positioning, to avoid a problem that downlink positioning reference signal resources are wasted because a plurality of positioning base stations participating in the positioning send downlink positioning reference signals according to a previous configuration with large bandwidths or high overheads.

It should be noted that, similarly to S210, when the base station sends the feedback information and/or the measurement gap configuration to the location server, the base station may send the feedback message and/or the measurement gap configuration directly or indirectly. This is not limited in this embodiment.

In the measurement gap configuration request method 200 provided in this embodiment, the base station receives the measurement gap request sent by the terminal and/or the location server, and can determine whether to configure the measurement gap and further feed back to the terminal and/or the base station the feedback information indicating whether the measurement gap is configured, so that the location server can finally know the configuration of the measurement gap by the base station, thereby avoiding a problem that resources may be wasted because the plurality of positioning base stations participating in the positioning still send downlink positioning reference signals according to the previous configuration with large bandwidths or high overheads, and ensuring that the downlink positioning reference signal measurement can be performed smoothly.

Figure 3:
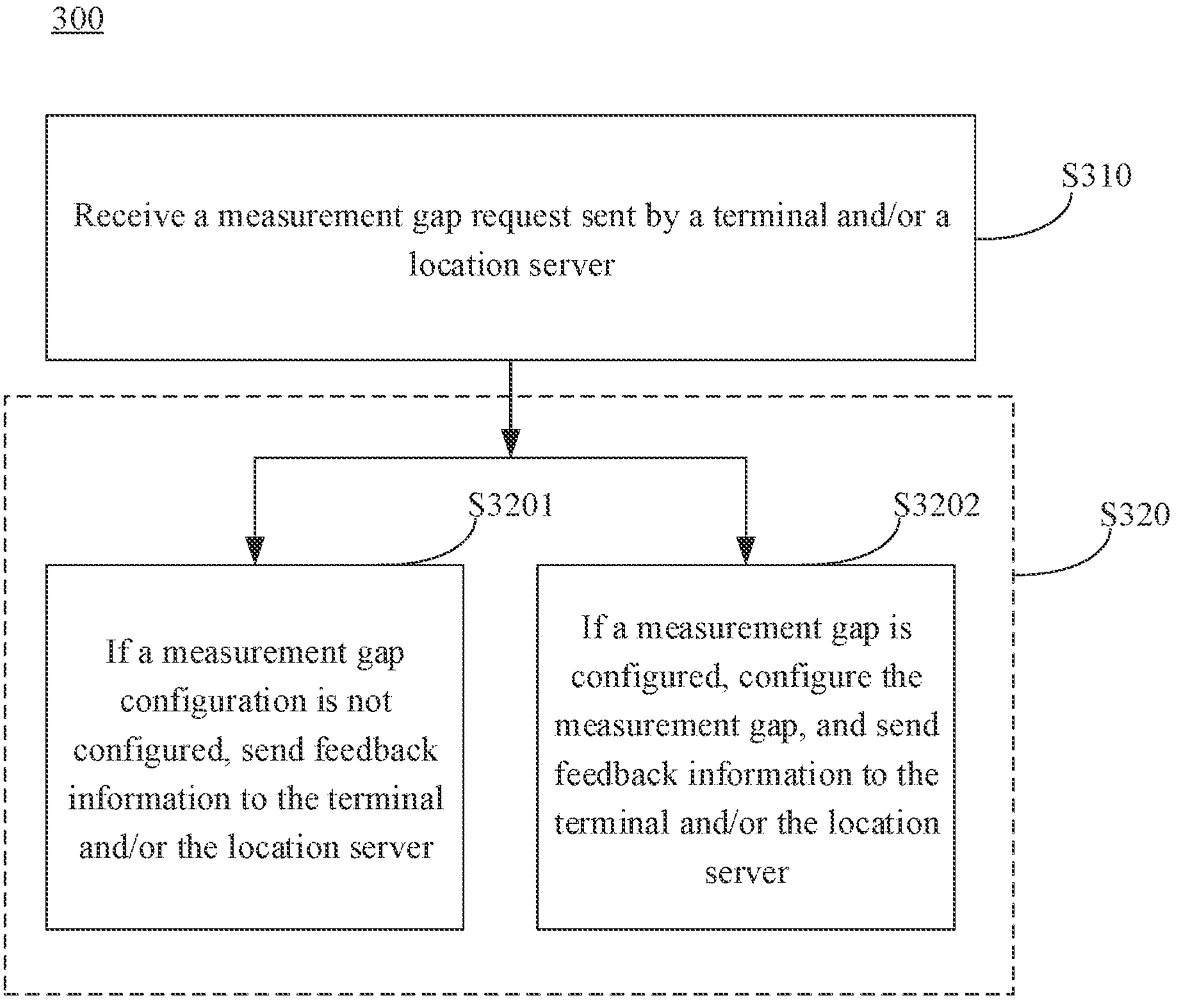
FIG. 3 is a schematic flowchart of a measurement gap configuration request method applied to a base station according to another exemplary embodiment of this application.

FIG. 3 is a schematic flowchart of a measurement gap configuration request method 300 according to an exemplary embodiment of this application. The method 300 may be applied to a base station, and may be performed by hardware or software in the base station. Referring to FIG. 3 again, the method 300 may include at least the following steps.

S310. Receive a measurement gap request sent by a terminal and/or a location server.

For the related process of S310, refer to the detailed description in S210. In addition, in a possible implementation, the measurement gap request may include at least one of the following content.

(1) Gap confirmation information, used to instruct the base station to confirm whether the measurement gap is configurable. In an implementation, the gap confirmation information may be further used to instruct the base station to feed back a confirmation result about whether the measurement gap is configurable, or the like.

(2) Gap feedback information, used to instruct the base station to feed back to the terminal and/or the location server whether the measurement gap is configurable. For example, the base station may feed back information to the terminal and/or the location server, to indicate whether the base station configures the measurement gap.

(3) A gap request, used to indicate to the base station that the terminal will use the measurement gap to perform measurement on a downlink positioning reference signal.

(4) Measurement frequency information, used to indicate frequency information by which the terminal performs measurement on the downlink positioning reference signal using the measurement gap. For example, the measurement frequency information may be but is not limited to absolute frequency position information or the like.

(5) Requested measurement gap configuration information, used to perform measurement on the downlink positioning reference signal. In some embodiments, the measurement gap configuration information may include at least one of a gap pattern identifier (ID), a gap offset, a gap period, gap duration, or a gap timing advance (gap TA).

For example, the measurement gap configuration information may be but is not limited to that shown in the following Table 1. For example, the gap period may be but is not limited to 20 ms, 40 ms, 80 ms, or 160 ms, and the gap duration may be 1.5 ms, 3 ms, 3.5 ms, 4 ms, 5.5 ms, or 6 ms.

(6) A start time of the measurement gap, where the start time of the measurement gap indicates that the measurement gap starts to take effect at or after a time point. For example, for an on-demand PRS configuration, the location server configures an effective time of an on-demand PRS. To match the effective time of the on-demand PRS, the location server may indicate the effective time of the measurement gap to the base station, such as a start effective time of the measurement gap, effective duration of the measurement gap, and an end time of the measurement gap.

(7) The end time of the measurement gap, where the end time of the measurement gap indicates that the measurement gap stops working or expires at or before a time point, with reference to the description in the foregoing (6).

(8) Effective duration of the measurement gap, where the effective duration of the measurement gap indicates duration within which the measurement gap is effective, with reference to the description in the foregoing (6).

(9) At least part of configuration information of the downlink positioning reference signal, where the at least part of configuration information of the downlink positioning reference signal indicates configuration information associated with the measurement gap, or configuration information when the terminal expects to perform the measurement in the measurement gap, to assist the base station in determining how to configure the measurement gap.

In an actual application, information included in the at least some configuration information varies depending on different types of downlink positioning reference signals. For example, when the downlink positioning reference signal is a PRS, the at least some configuration information may include PRS frequency domain position information (such as frequency domain layer (Frequency Layer) information, bandwidth (band) information, and start position information), time domain position information (such as a PRS period, an offset, and duration), and the like, or the at least some configuration information may further include PRS identification information and the like.

TABLE 1

| Gap pattern identifier | Measurement gap length (ms) | Gap duration (ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |

The PRS identification (ID) information may include at least one of a positioning frequency layer ID, a Transmission and Reception Point (TRP) ID, a PRS resource set ID, a PRS resource ID, or a frequency band ID. In some embodiments, the positioning frequency layer ID may be a positioning frequency layer ID configured by the location server, or may be an ID when the terminal sends the measurement gap request. For example, the terminal requests the measurement gap for four positioning frequency layers, and IDs of the positioning frequency layers may be 0, 1, 2, and 3.

(10) Priority information (that is, importance), used to indicate a priority of measurement on the downlink positioning reference signal or a location service in the measurement gap, to assist the base station in confirming whether to configure the measurement gap and how to perform a subsequent action. For example, if the priority of measurement on the downlink positioning reference signal in the measurement gap is high, the base station interrupts other services such as a physical downlink shared channel (PDSCH), and configures the measurement gap for measurement on the downlink positioning reference signal. In an actual application, the priority (or importance) may be divided into a plurality of levels (for example, 0, 1, 2, 3, . . . , where 0 represents a highest level), and the terminal or the location server may indicate that the priority (or importance) is any one of the plurality of levels.

It should be noted that the priority (or importance) of performing the downlink positioning reference signal measurement in the measurement gap may be indicated by the location server, or determined by the terminal, or preconfigured, or prescribed in a protocol. For example, when the terminal determines the priority, the terminal may determine the priority according to received positioning request information such as QoS. This is not limited in this embodiment.

(11) Bandwidth part BWP activation information, used to instruct the base station to activate a BWP in a case that the measurement gap being unconfigurable is determined, so as to perform measurement on the downlink positioning reference signal in the activated BWP. In some embodiments, the BWP activation information may further include at least BWP configuration information expected by the terminal, such as BWP identification information and BWP frequency domain position information.

In an implementation, when the base station determines not to configure the measurement gap, the base station may switch a current active DL BWP of the terminal to a target BWP, such as a new BWP or a positioning BWP, or the base station directly activates a target BWP, such as a new BWP or a positioning BWP. The positioning BWP is a BWP dedicated to positioning.

It should be noted that the measurement gap request may include one or a combination of more of the foregoing, or may include other information than the foregoing eleven types of information, or the like. This is not limited in this embodiment.

In addition, because the terminal can request a corresponding measurement gap for each frequency layer, each frequency layer may correspond to a group of parameters, and each group of parameters may include at least gap confirmation information, gap feedback information, a gap request, measurement frequency information, requested measurement gap configuration information, a start time of the measurement gap, an end time of the measurement gap, effective duration of the measurement gap, at least part of configuration information of the downlink positioning reference signal, priority information, bandwidth part BWP activation information, and the like, where the gap confirmation information, the gap feedback information, the gap request, the start time of the measurement gap, the end time of the measurement gap, the effective duration of the measurement gap, the priority information, and the bandwidth part BWP activation information may be configured for each frequency layer, or may be common parameters of a plurality of frequency layers. This is not limited in this embodiment.

In the foregoing possible implementation, the terminal or the location server exchanges more useful information with the base station, so that the base station can learn more useful information. This increases a possibility that the base station configures the measurement gap and avoids a problem that a positioning service cannot meet a requirement due to the configuration of the measurement gap.

S320. Sending feedback information to the terminal and/or the location server. The feedback information is used to indicate whether the base station configures the measurement gap for measurement on the downlink positioning reference signal.

For the related description in S320, refer to the detailed description in S220. In addition, referring to FIG. 3 again, in a possible implementation, the sending feedback information to the terminal and/or the location server in S320 includes the following steps.

S3201. If the measurement gap configuration is not configured, send the feedback information to the terminal and/or the location server, where the feedback information indicates that the base station does not configure the measurement gap. In an actual application, actual content of the feedback information may be set based on a requirement. For example, the feedback information may include at least one of the following:

(1) An identifier of the downlink positioning reference signal for which the measurement gap is not configured. Depending on different downlink positioning reference signals, identifiers of the downlink positioning reference signals are different. For example, the identifier of the downlink positioning reference signal may include a positioning frequency layer identifier used to indicate a positioning frequency layer for which the associated measurement gap is not configured, or may include at least one of a TRP ID, a PRS resource set ID, and a PRS resource ID, used to indicate a positioning reference signal for which the associated measurement gap is not configured.

(2) Configuration information of the measurement gap that is not configured, used to indicate which requested measurement gap/gaps is/are not configured. In some embodiments, the configuration information includes at least one of frequency information for performing the measurement, a gap pattern identifier, a gap offset, a gap period, gap duration, and a gap timing advance.

(3) At least part of information in downlink BWP configuration information, used to indicate a range within which the terminal can perform the downlink positioning reference signal measurement within a current carrier range of the location server and/or the terminal.

In some embodiments, at least some configuration information in the downlink BWP configuration information may include active and/or inactive DL BWP configuration information in one or more carriers (for example, including but not limited to at least one of a frequency domain position, a bandwidth, a BWP timer, a BWP identifier, or a subcarrier spacing), and configuration information of a carrier in which a BWP is located (for example, including but not limited to at least one of the following information: a carrier frequency domain position, a bandwidth, or an identifier).

(4) Recommended measurement gap configuration information, used to indicate a measurement gap configuration that is more recommended by the base station in comparison with the measurement gap requested by the location server and/or the terminal. In some embodiments, the measurement gap configuration information may be determined by the base station comprehensively based on one or more measurement gap requests of the location server and/or the terminal.

(5) Recommended downlink positioning reference signal configuration information, where the recommended downlink positioning reference signal configuration information may be determined by the base station comprehensively based on one or more measurement gap requests of the location server and/or the terminal.

(6) BWP activation request indication signaling, used to instruct or trigger the terminal to initiate a BWP activation procedure and perform measurement on the downlink positioning reference signal in a newly activated BWP. The BWP activation request indication signaling is further used to indicate configuration information of the activated BWP.

(7) A cause for not configuring the measurement gap. In some embodiments, the cause for not configuring the measurement gap may include the following: overheads are excessive, a time-domain channel cannot be occupied, a frequency-domain channel cannot be occupied, or the gap is not supported in a current serving cell.

It should be noted that, that the gap is not supported in a current serving cell means that for a plurality of terminals belonging to a same base station, if requests of the plurality of terminals for the measurement gap configuration are all rejected by the base station, the base station may feed back to the location server and/or the terminal the information including that the gap is not supported in the current serving cell.

S3202. If the measurement gap is configured, send the feedback information to the terminal and/or the location server.

The feedback information indicates that the base station configures the measurement gap. In some embodiments, the feedback information may include configuration information of the measurement gap configured by the base station, or the like. This is not limited in this embodiment.

Further, in another possible implementation of this embodiment, if the measurement gap is not configured, the base station triggers a BWP activation procedure, and sends signaling for activating a target BWP to the terminal.

The target BWP may be a dedicated positioning BWP or a BWP other than a downlink BWP currently activated by the terminal, so that the terminal performs measurement on the downlink positioning reference signal in the target BWP.

In addition, the target BWP activation signaling may include at least configuration information for activating the BWP, such as BWP identification information. When the measurement gap is unavailable, the terminal may switch to the target BWP to perform measurement on the downlink positioning reference signal. The target BWP may be configured by a network, preconfigured, or prescribed in a protocol.

In the measurement gap configuration method 300 provided in this embodiment, the base station determines, according to the measurement gap request, how to configure the measurement gap and whether to configure the measurement gap. This can effectively avoid a problem that a positioning demand cannot be met or that resources are wasted due to a measurement gap configuration problem, and can meet different positioning demands of different terminals.

It should be noted that the measurement gap configuration request methods 200 and 300 provided in the embodiments of this application may be performed by a measurement gap configuration request apparatus or a control module configured to perform the measurement gap configuration request method 200 or 300 in the measurement gap configuration request apparatus.

Figure 4:
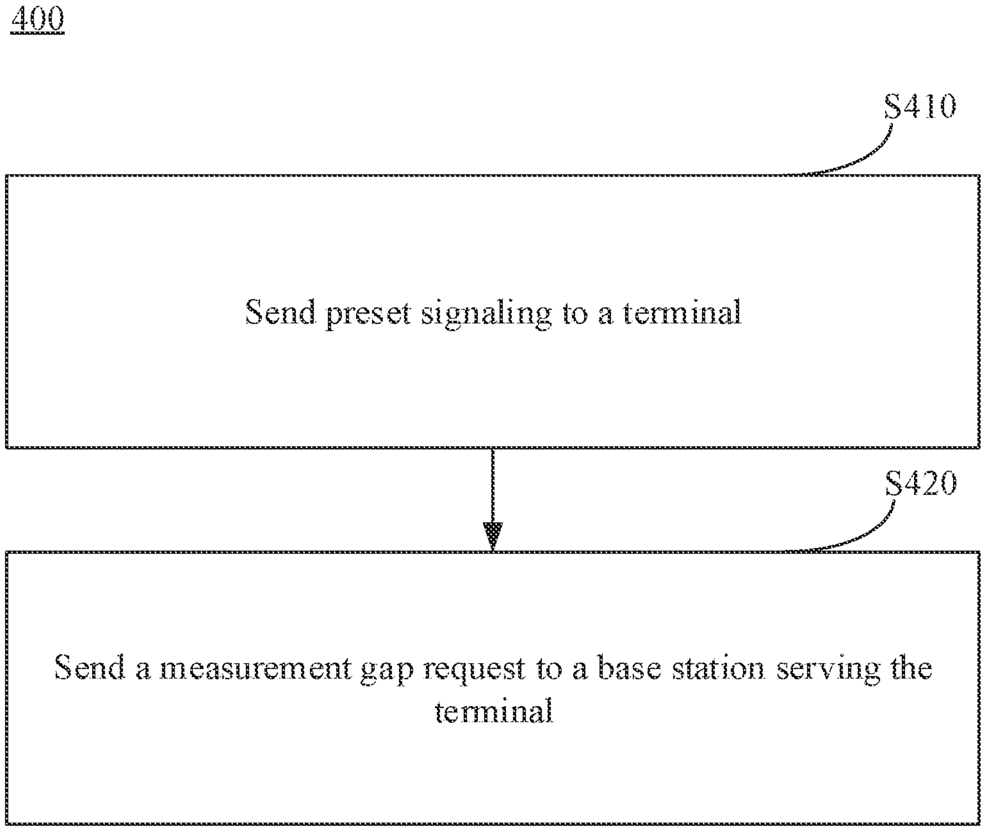
FIG. 4 is a schematic flowchart of a measurement gap configuration request method applied to a location server according to an exemplary embodiment of this application.

FIG. 4 is a schematic flowchart of a measurement gap configuration request method 400 according to an exemplary embodiment of this application. The method 400 may be applied to a location server, and may be performed by hardware or software in the location server. Referring to FIG. 4 again, the method 400 may include at least the following steps.

S410. Send preset signaling to a terminal.

The preset signaling includes at least part of information in current downlink positioning reference signal configuration information, so that the terminal determines, based on the at some information, whether a measurement gap is required. Configuration information of a downlink positioning reference signal may also be represented as auxiliary information of the downlink positioning reference signal. In an actual application, actual content included in the at least some information may be flexibly set based on a requirement.

S420. Send a measurement gap request to a base station serving the terminal.

The measurement gap request is used to indicate the base station to configure a measurement gap for measurement on a downlink positioning reference signal, and/or the measurement gap request is used to indicate the base station to feed back to the terminal and/or the location server whether the measurement gap is configurable.

In an actual application, the location server may send the measurement gap request to the base station in a case that the location server itself determines that the terminal requires a measurement gap configuration, or may send the measurement gap request based on information that is fed back by the terminal and used to indicate that a measurement gap configuration is required. This is not limited in this embodiment.

In addition, for the related description of the downlink positioning reference signal and the related description of a data transmission mode between the location server and the base station, refer to the foregoing detailed descriptions of S210 and S220. Details are not described herein again in this embodiment.

In the measurement gap configuration request method provided in this embodiment, the location server sends the measurement gap request to the base station serving the terminal, so that the base station determines whether to configure the measurement gap and feeds back whether the measurement gap is configured. Therefore, the location server and/or the terminal can know the configuration of the measurement gap by the base station, and further avoid a problem that resources are wasted because a plurality of positioning base stations participating in positioning still send downlink positioning reference signals according to a previous configuration with large bandwidths or high overheads.

Figure 5:
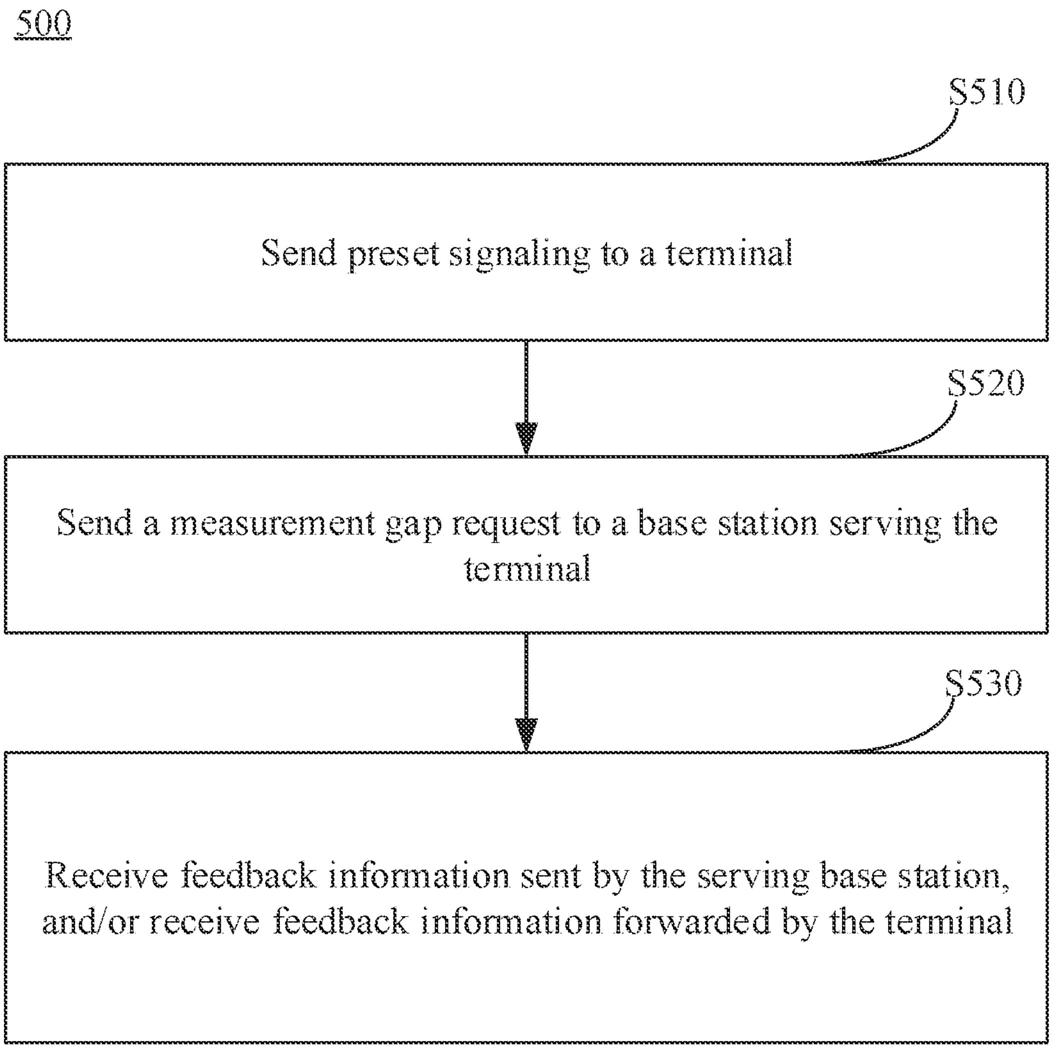
FIG. 5 is a schematic flowchart of a measurement gap configuration request method applied to a location server according to another exemplary embodiment of this application.

FIG. 5 is a schematic flowchart of a measurement gap configuration request method 500 according to an exemplary embodiment of this application. The method 500 may be applied to a location server, and may be performed by hardware or software in the location server. Referring to FIG. 5 again, the method 500 may include at least the following steps.

S510. Send preset signaling to a terminal.

For S510, refer to the detailed description of S410. In addition, the preset signaling may be further used to request the terminal to determine whether to request a measurement gap, and/or the preset signaling is used to request at least one of configuration information of the measurement gap, a frequency for performing a measurement, or identification information of a downlink positioning reference signal associated with the measurement gap expected by the terminal. Therefore, the preset signaling can be used to implement information exchange between the location server and the terminal, so that the terminal and/or the location server can more accurately determine whether a measurement gap configuration is required and that the location server determines how to perform a subsequent operation.

S520. Send a measurement gap request to a base station serving the terminal.

For S520, refer to the related description in S420. In addition, in a possible implementation, the measurement gap request may include at least one of the following content:

(1) gap confirmation information, used to instruct the base station to confirm whether the measurement gap is configurable;

(2) gap feedback information, used to instruct the base station to feed back to the terminal and/or the location server whether the measurement gap is configurable;

(3) a gap request, used to indicate to the base station that the terminal is to use the measurement gap to perform measurement on the downlink positioning reference signal;

(4) measurement frequency information, used to indicate frequency information by which the terminal performs measurement using the measurement gap;

(5) requested measurement gap configuration information;

(6) a start time of the measurement gap;

(7) an end time of the measurement gap;

(8) effective duration of the measurement gap;

(9) at least part of configuration information of the downlink positioning reference signal;

(10) priority information, used to indicate a priority of measurement on the downlink positioning reference signal or a location service in the measurement gap; or

(11) bandwidth part BWP activation information, used to instruct the base station to activate a BWP in a case that the measurement gap being unconfigurable is determined, so as to perform measurement on the downlink positioning reference signal in the activated BWP.

It should be noted that, for detailed content of the foregoing information included in the measurement gap request, reference may be made to the detailed description in S310. Details are not described herein again in this embodiment.

S530. Receive feedback information sent by the base station, and/or receive feedback information forwarded by the terminal.

The feedback information is used to indicate whether the base station configures the measurement gap. In some embodiments, if the feedback information received by the location server indicates that the base station does not configure the measurement gap, the feedback information may include at least one of the following:

(1) an identifier of the downlink positioning reference signal for which the measurement gap is not configured;

(2) configuration information of the measurement gap that is not configured;

(3) at least part of information in downlink BWP configuration information;

(4) recommended measurement gap configuration information;

(5) recommended downlink positioning reference signal configuration information;

(6) BWP activation request indication signaling, used to instruct or trigger the terminal to initiate a BWP activation procedure and perform measurement on the downlink positioning reference signal in a newly activated BWP; or (7) a cause for not configuring the measurement gap.

It should be noted that, for detailed content of the foregoing information included in the feedback information, reference may be made to the detailed description in S320. Details are not described herein again in this embodiment.

In addition, in a possible implementation, to determine a new downlink positioning reference signal measurement parameter for the terminal and ensure that the measurement is performed smoothly, in a case that the feedback information received by the location server indicates that the base station does not configure the measurement gap, the location server may further perform at least one of the following (1) to (5).

(1) Determining new downlink positioning reference signal configuration information, to match a requirement of the base station.

The new downlink positioning reference signal configuration information includes downlink positioning reference signal configuration information before the current downlink positioning reference signal configuration information of the terminal, or downlink positioning reference signal configuration information obtained by updating (modifying) the current downlink positioning reference signal configuration information based on the feedback information, or a current on-demand downlink reference signal configuration is restored to a conventional downlink reference signal configuration, or the like.

It should be noted that updating the downlink positioning reference signal configuration information may be restoring a positioning frequency layer configuration before the measurement gap request is rejected. Correspondingly, that the location server delivers a PRS configuration to the terminal and/or the base station participating in the location service may be delivering a previous frequency layer configuration obtained through restoration.

In an actual application, assuming that the downlink positioning reference signal is a PRS, the determining new downlink positioning reference signal configuration information may include: increasing or decreasing or changing the PRS configuration according to the feedback information, including but not limited to at least one of increasing a PRS bandwidth, increasing a PRS period (duration), reducing the PRS period, adding a frequency layer, or the like, to match the requirement of the base station. In some embodiments, the determining new downlink positioning reference signal configuration information may further include: restoring the current on-demand downlink reference signal configuration to the conventional downlink reference signal configuration, and restoring the reference signal configuration modified for on-demand positioning to a conventional configuration before the modification (for example, for on-demand positioning, the PRS bandwidth is increased based on the original PRS configuration; after the bandwidth is increased, the terminal needs to request the measurement gap to perform the PRS measurement, but the measurement gap is rejected by the base station; in this case, the location server can restore the bandwidth modified for the on-demand PRS to the normal bandwidth before the modification). This is not limited in this embodiment. Herein, the new downlink positioning reference signal configuration may also be understood as updated, modified, restored, or the like. In some cases, the conventional configuration may mean that no positioning reference signal is sent.

In addition, while determining the new downlink positioning reference signal configuration information, the location server may further determine one or more positioning base stations that participate in a positioning service and are located around the terminal.

(2) Sending the new downlink positioning reference signal configuration information to the terminal and/or a positioning base station that participates in a downlink positioning reference signal positioning service.

The new downlink positioning reference signal configuration information may be sent to the terminal by using signaling LPP or the like, and the new downlink positioning reference signal configuration information is sent to each positioning base station by using signaling LPPa or the like. Correspondingly, each positioning base station sends a downlink positioning reference signal to the terminal according to the received new downlink positioning reference signal configuration information, and the terminal performs measurement on the downlink positioning reference signal according to the downlink positioning reference signal sent by each positioning base station and the downlink positioning reference signal configuration information sent by the location server.

It should be noted that in a conventional downlink reference signal configuration scenario, the location server may not deliver the conventional downlink reference signal configuration to the terminal or the positioning base station.

(3) Adjusting a preset positioning demand and/or a performance indicator of the terminal, and sending an adjusted positioning demand and/or an adjusted performance indicator of the terminal to an upper-layer network node.

The upper-layer network node may be a core network node or the like. This is not limited in this embodiment.

(4) Sending, to the upper-layer network node, information indicating inability to meet the preset positioning demand and a cause for the inability to meet the preset positioning demand.

The cause for the inability to meet the preset positioning demand may be set based on an actual situation. For example, the cause may be that the base station does not configure the measurement gap, or that the measurement gap configuration fed back by the base station is not received, or that the positioning base station fails to send the signal.

(5) Sending a BWP activation request to the base station. In some embodiments, the BWP activation request includes at least BWP configuration information expected by the terminal, such as a BWP identifier expected by the terminal.

In another possible implementation, if the feedback information received by the location server indicates that the base station configures the measurement gap, the location server sends the current downlink positioning reference signal configuration information or other information than the at least part of information in the current downlink positioning reference signal configuration information to the terminal and/or the positioning base station participating in the downlink positioning reference signal positioning service, so that the terminal performs the corresponding measurement based on the received downlink positioning reference signal, thereby ensuring that the measurement process is performed smoothly.

Figure 6:
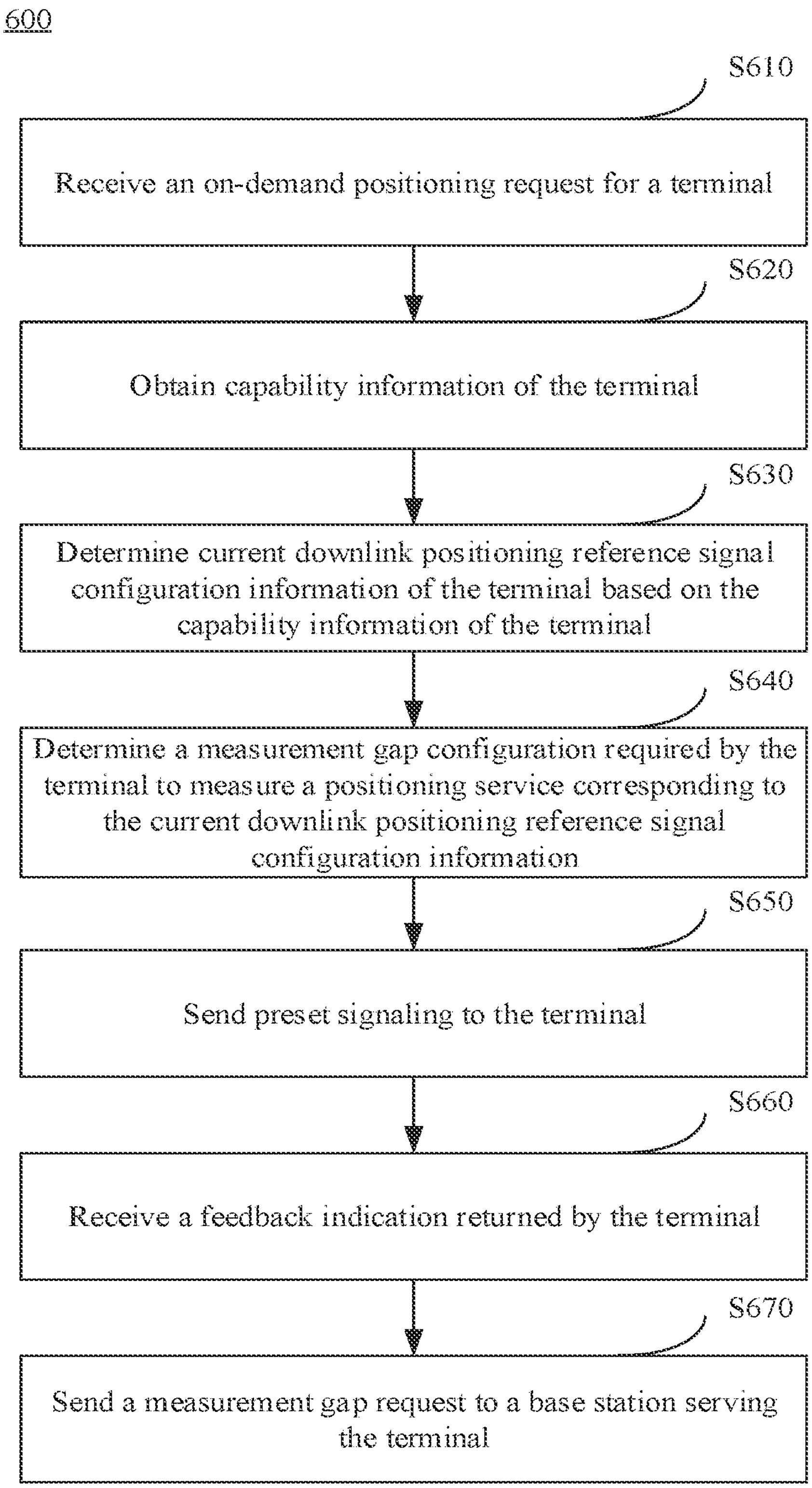
FIG. 6 is a schematic flowchart of a measurement gap configuration request method applied to a location server according to still another exemplary embodiment of this application.

FIG. 6 is a schematic flowchart of a measurement gap configuration request method 600 according to an exemplary embodiment of this application. The method 600 may be applied to a location server, and may be performed by hardware or software in the location server. Referring to FIG. 6 again, the method 600 may include at least the following steps.

S610. Receive an on-demand positioning request for a terminal.

In this embodiment, by using an on-demand positioning request, a downlink positioning reference signal configuration can be flexibly increased or decreased based on a positioning demand of one or more terminals. For example, if a pre-deployed downlink positioning reference signal is a downlink positioning reference signal with a small bandwidth, but a terminal requires high positioning accuracy, a dedicated downlink positioning reference signal with a large bandwidth can be configured for the terminal by using signaling. Therefore, while the terminal with a high positioning accuracy requirement is met, a problem of resource waste that may occur due to some terminals with low positioning accuracy requirements can also be avoided, and positioning demands of different terminals can be effectively met.

In an actual application, the positioning request may be sent by a core network node or another network node. In addition to the on-demand positioning request, the positioning request may be a conventional positioning request. This is not limited in this embodiment. For details, refer to the description in S210.

S620. Obtain capability information of the terminal.

During obtaining of the capability information of the terminal, the location server may obtain the capability information of the terminal by sending capability information obtaining signaling or the like to the terminal. In some embodiments, the capability information of the terminal may be but is not limited to a maximum downlink positioning reference signal (such as a PRS) configuration supported by the terminal, a capability of processing a downlink positioning reference signal by the terminal, or the like.

S630. Determine current downlink positioning reference signal configuration information of the terminal based on the capability information of the terminal and/or the on-demand positioning request for the terminal.

S640. Determine a measurement gap configuration required by the terminal to perform measurement on a target positioning service.

The target positioning service is a positioning service corresponding to the current downlink positioning reference signal configuration information. The measurement gap configuration may be determined in a plurality of manners. For example, in a possible implementation, an implementation process of S640 may include: receiving BWP configuration information (such as BWP frequency domain position information) of the terminal that is sent by the terminal and/or a base station; and determining, based on the BWP configuration information and the current downlink positioning reference signal configuration information, the measurement gap required by the terminal to perform measurement on the positioning service corresponding to the current downlink positioning reference signal configuration information.

In some embodiments, the BWP configuration information includes at least active and/or inactive DL BWP configuration information (for example, including but not limited to at least one of a frequency domain position, a bandwidth, a BWP timer, a BWP identifier, or a subcarrier spacing) in one or more carriers (for example, the carrier may also be understood as a serving cell), and configuration information of a carrier in which a BWP is located (for example, including but not limited to at least one of the following information: a carrier frequency domain position, a bandwidth, or an identifier). This is not limited in this embodiment.

S650. Send preset signaling to the terminal.

For the related description of S650, refer to the detailed description of S510. Details are not described herein again in this embodiment.

S660. Receive a feedback indication returned by the terminal.

The feedback indication is used to indicate whether the terminal requests the measurement gap and/or a cause for whether the terminal requests the measurement gap. In some embodiments, the cause for requesting the measurement gap may be at least one of the following: A preset positioning demand cannot be met because a positioning measurement is not performed in the measurement gap, a bandwidth of an active BWP is insufficient, active BWP numerology is different from a PRS configuration, or the like. The cause for not requesting the measurement gap may be that according to the current downlink positioning reference signal configuration information, even if the measurement gap is not requested, the preset positioning demand can be met, or the like.

In an actual application, if the feedback indication indicates that the terminal has requested the measurement gap, the location server may wait for the terminal or the base station to feed back feedback signaling about whether the measurement gap is configured, and determine, according to the feedback signaling, to perform a subsequent operation. Conversely, if the feedback indication indicates that the terminal does not request the measurement gap, the location server can perform a subsequent positioning step normally (in a case of not requesting the measurement gap, the location server may assume that the terminal can meet the measurement accuracy requirement based on the current PRS configuration).

In addition, if the location server does not receive the feedback indication, it can be determined that the terminal does not request the measurement gap or that the terminal does not require the measurement gap configuration. This may be set based on an actual requirement.

In some embodiments, the feedback indication may further include whether the terminal needs to request the measurement gap and/or the measurement gap configuration expected by the terminal. If the terminal feeds back that the measurement gap needs to be requested, the location server may perform the related step in S670.

S670. Send a measurement gap request to a base station serving the terminal.

For the related description of S670, refer to the detailed description of S520. Details are not described herein again in this embodiment.

It should be noted that, in the measurement gap configuration request method 600 provided above, the process of performing the measurement gap configuration request by the location server may be but is not limited to the sequence in S610 to S670, and the process of performing the measurement gap configuration request may include more or fewer steps than the foregoing steps. For example, the location server may perform at least one of the following before performing S650:

(1) obtaining capability information of the terminal in a case that the on-demand positioning request for the terminal is received;

(2) determining the current downlink positioning reference signal configuration information of the terminal based on the capability information of the terminal and/or the on-demand positioning request; or (3) determining the measurement gap configuration required by the terminal to perform measurement on the target positioning service.

For the descriptions of related embodiments of (1) to (3), refer to the embodiment of the base station. Therefore, details are not described herein again.

In addition, the measurement gap configuration request methods 400 to 600 provided in the embodiments of this application may be performed by a measurement gap configuration request apparatus, or a control module configured to perform the measurement gap configuration request methods 400 to 600 in the measurement gap configuration request apparatus. In the embodiments of this application, assuming that the measurement gap configuration request apparatus performs the measurement gap configuration request methods, the measurement gap configuration request apparatus provided in the embodiments of this application is described.

Figure 7:
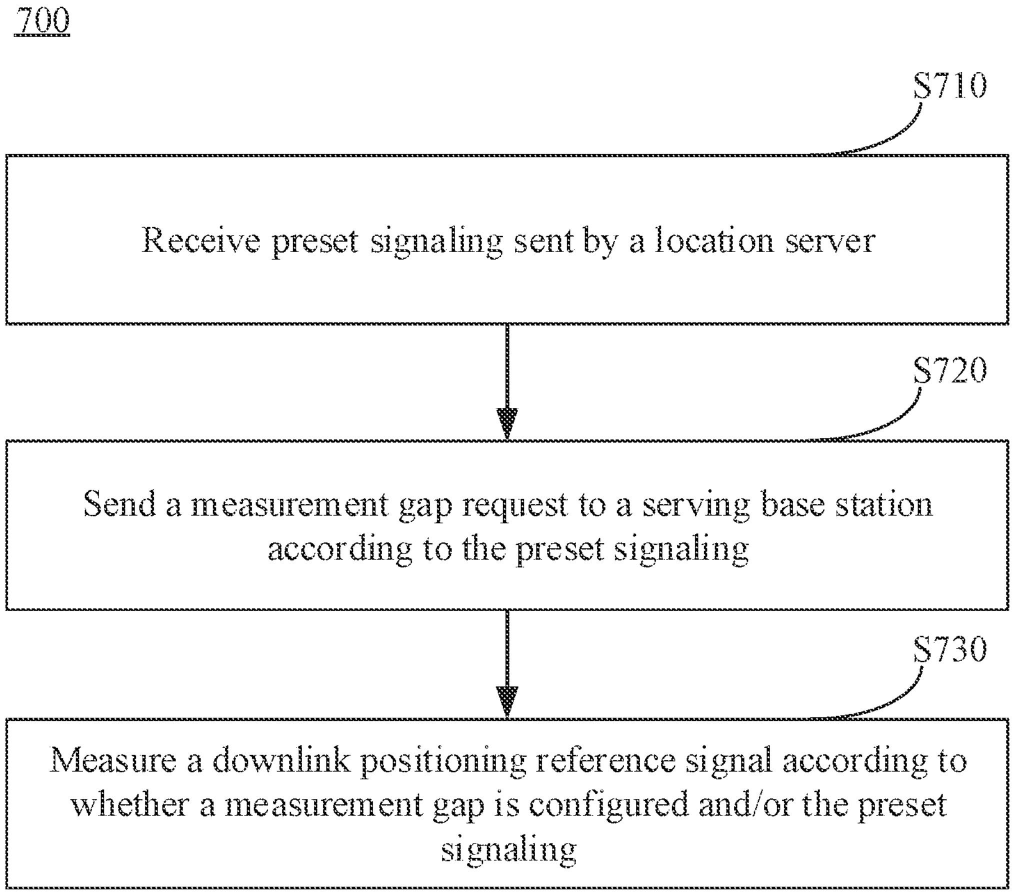
FIG. 7 is a schematic flowchart of a measurement method applied to a terminal according to an exemplary embodiment of this application.

FIG. 7 is a schematic flowchart of a measurement gap configuration request method 700 according to an exemplary embodiment of this application. The method 700 may be applied to a terminal, and may be performed by hardware or software in the terminal. Referring to FIG. 7 again, the method 700 may include at least the following steps.

S710. Receive preset signaling sent by a location server.

The preset signaling includes at least part of information in current downlink positioning reference signal configuration information, for determining whether a measurement gap configuration is required.

S720. Send a measurement gap request to a base station according to the preset signaling.

The measurement gap request is used to indicate the base station to configure a measurement gap for measurement on a downlink positioning reference signal.

S730. Perform measurement on the downlink positioning reference signal according to whether the measurement gap is configured and/or the preset signaling.

When the terminal performs the downlink positioning reference signal measurement, each positioning base station determined by the location server and participating in the positioning measurement can activate, according to received downlink positioning reference signal configuration information, a DL BWP to send a downlink positioning reference signal to the terminal, so that the terminal implements the positioning measurement based on the received downlink positioning reference signal.

In addition, it should be noted that, for the related processes in S710 to S730, reference may be made to the detailed descriptions in the measurement gap configuration requests 400 to 600. To avoid repetition, details are not described herein again.

In the foregoing measurement method provided in this embodiment, the terminal sends the measurement gap request to the base station, and then performs measurement on the downlink positioning reference signal according to the measurement gap and/or the preset signaling, thereby avoiding a problem that resources may be wasted because a plurality of positioning base stations participating in the positioning still send downlink positioning reference signals according to a previous configuration with large bandwidths or high overheads.

Figure 8:
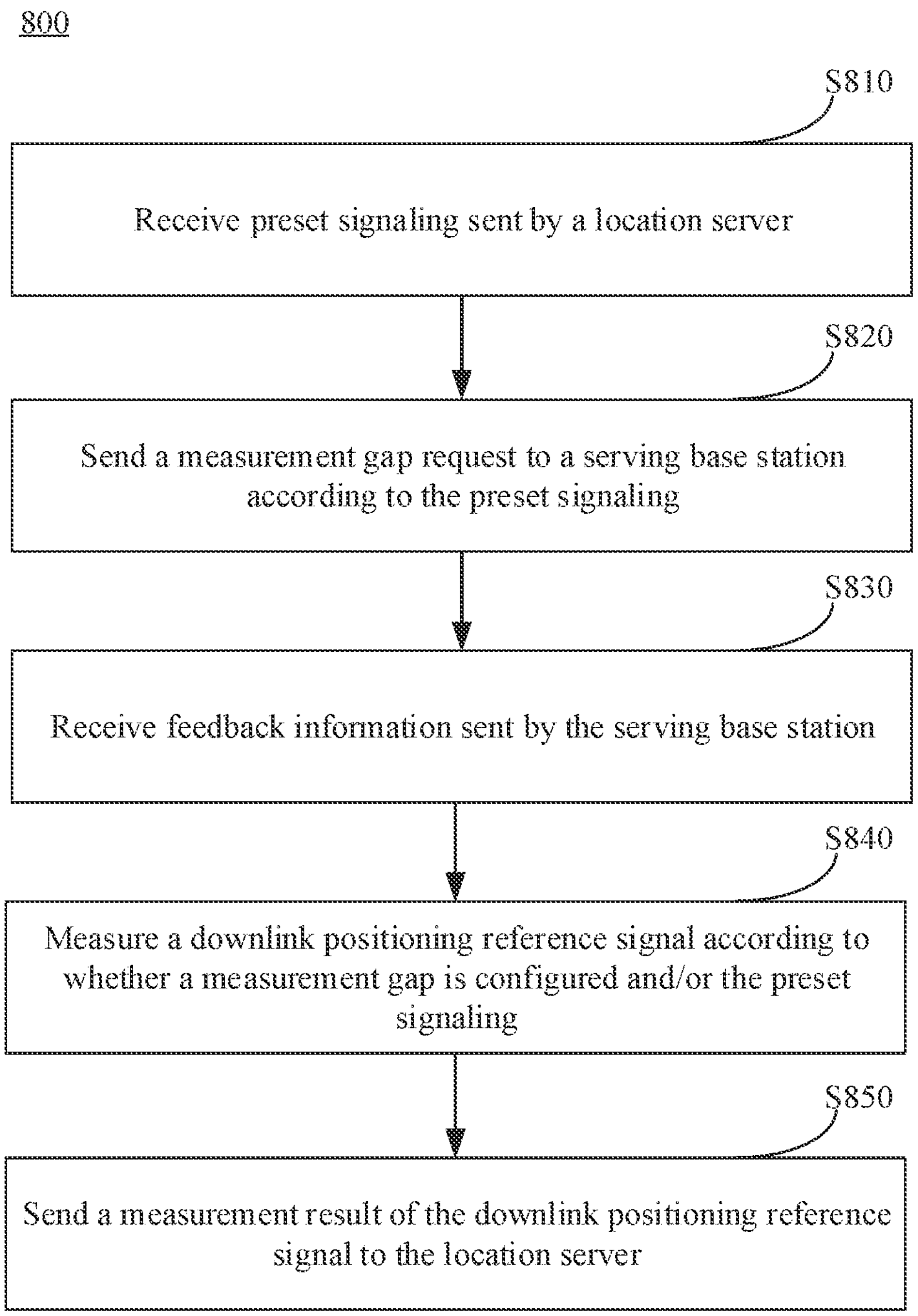
FIG. 8 is a schematic flowchart of a measurement method applied to a terminal according to another exemplary embodiment of this application.

FIG. 8 is a schematic flowchart of a measurement gap configuration request method 800 according to an exemplary embodiment of this application. The method 800 may be applied to a terminal, and may be performed by hardware or software in the terminal. Referring to FIG. 8 again, the method 800 may include at least the following steps.

S810. Receive preset signaling sent by a location server.

In an implementation, the preset signaling is further used to request the terminal to feed back whether to request a measurement gap, and/or the preset signaling is used to request at least one of configuration information of the measurement gap, frequency information for performing a measurement, or identification information of a downlink positioning reference signal associated with the measurement gap expected by the terminal.

In an actual application, after the terminal receives the preset signaling from the location server, the terminal may send a feedback indication to the location server, where the feedback indication is used to indicate whether the terminal requests the measurement gap. In addition, depending on different preset signaling, the feedback indication may be further used to indicate at least one of the following (1) to (3).

(1) Whether the terminal sends a measurement gap request to a base station.

(2) A cause for whether the terminal sends the measurement gap request to the base station.

The cause for sending the measurement gap request may be at least one of the following information: A preset positioning demand cannot be met, a bandwidth of an active BWP is insufficient, active BWP numerology is different from a PRS configuration, or the like. Correspondingly, the cause for not sending the measurement gap request may be that the preset positioning demand can be met, or the like.

(3) An identifier of the downlink positioning reference signal associated with the measurement gap request.

For the identifier of the downlink positioning reference signal, refer to the detailed description in S3201. Details are not described herein again in this embodiment.

S820. Send a measurement gap request to the base station according to the preset signaling.

The measurement gap request includes at least one of the following (1) to (11):

(1) gap confirmation information, used to instruct the base station to confirm whether the measurement gap is configurable;

(2) gap feedback information, used to instruct the base station to feed back to the terminal and/or the location server whether the measurement gap is configurable;

(3) a gap request, used to indicate to the base station that the terminal is to use the measurement gap to perform measurement on the downlink positioning reference signal;

(4) measurement frequency information, used to indicate frequency information by which the terminal performs measurement using the measurement gap;

(5) requested measurement gap configuration information;

(6) a start time of the measurement gap;

(7) an end time of the measurement gap;

(8) effective duration of the measurement gap;

(9) at least part of configuration information of the downlink positioning reference signal;

(10) priority information, used to indicate a priority of measurement on the downlink positioning reference signal or a location service in the measurement gap; or

(11) bandwidth part BWP activation information, used to instruct the base station to activate a BWP in a case that the measurement gap being unconfigurable is determined, so as to perform measurement on the downlink positioning reference signal in the activated BWP.

It should be noted that, for detailed content of the foregoing information included in the measurement gap request, reference may be made to the detailed description in S310. Details are not described herein again in this embodiment.

S830. Receive feedback information sent by the base station.

If the feedback information indicates that the base station configures the measurement gap, S840 and S850 are performed; otherwise, a preset operation in S860 is performed.

In addition, in a possible implementation, if the feedback information indicates that the base station does not configure the measurement gap, the feedback information may include at least one of the following (1) to (7):

(1) an identifier of the downlink positioning reference signal for which the measurement gap is not configured;

(2) configuration information of the measurement gap that is not configured;

(3) at least part of information in downlink BWP configuration information;

(4) recommended measurement gap configuration information;

(5) recommended downlink positioning reference signal configuration information;

(6) BWP activation request indication signaling, used to instruct or trigger the terminal to initiate a BWP activation procedure and perform measurement on the downlink positioning reference signal in a newly activated BWP, where in a case that the BWP activation request indication signaling indicates that the base station triggers BWP switching, the terminal switches to a target BWP, where the target BWP is a positioning BWP or a new BWP other than a downlink BWP currently activated by the terminal; or (7) a cause for not configuring the measurement gap.

It should be noted that, for detailed content of the foregoing information included in the feedback information, reference may be made to the detailed description in S320. Details are not described herein again in this embodiment.

S840. Perform measurement on the downlink positioning reference signal according to whether the measurement gap is configured and/or the preset signaling.

S850. Send a measurement result of the downlink positioning reference signal to the location server.

The measurement result of the downlink positioning reference signal includes at least one of the following information (1) to (4).

(1) The measurement result of the downlink positioning reference signal. The measurement result is an estimated value of the positioning measurement result.

(2) Whether the downlink positioning reference signal is measured in the measurement gap.

In some embodiments, performing measurement on the downlink positioning reference signal in the measurement gap may implicitly indicate that the measurement gap request is sent to the base station; conversely, not performing measurement on the downlink positioning reference signal in the measurement gap may implicitly indicate that the measurement gap request is sent to the base station but the measurement gap is not configured.

In addition, if the downlink positioning reference signal is measured in the measurement gap, the terminal may further send specific information of the downlink positioning reference signal measured in the measurement gap, for example, a type of the downlink positioning reference signal, a measurement bandwidth, a measurement frequency layer, a PRS resource for the measurement, a PRS resource set for the measurement, and a TRP identifier for the measurement. In some embodiments, the terminal may further send identifiers corresponding to the foregoing information, such as a frequency layer ID, a TRP ID, a PRS resource set ID, a resource ID, and a band ID.

If the positioning reference signal is not measured in the measurement gap, specific information of the corresponding positioning reference signal may also be sent. Refer to the foregoing embodiment. Details are not described herein again.

(3) Whether the measurement gap request is sent to the base station. In some embodiments, the specific information of the corresponding positioning reference signal may also be sent in the information about whether the measurement gap is requested. Refer to the foregoing description.

In a possible implementation, when implementing the sending of (1), the terminal may not send any information to implicitly indicate whether the terminal has sent the measurement gap request.

In addition, if the terminal has sent the measurement gap request, the terminal may further send information about downlink positioning reference signals (such as PRSs) for which the measurement gap configuration is not requested, for example, send an identifier of a downlink positioning reference signal for which the measurement gap configuration is not requested.

(4) The identifier of the associated downlink positioning reference signal.

In an implementation, the terminal may send the information in the foregoing (1) to (4) in a form of a bit 0 or 1.

In some embodiments, the terminal may further send, in the following manner, whether the PRS measurement is performed by using the measurement gap and/or whether the measurement gap configuration is requested:

The terminal sends only positioning reference signals for which the measurement gap is requested but which are not measured in the measurement gap. For the specific information of the positioning reference signal, refer to the corresponding description in the foregoing embodiment. For example, for a measurement result, a bit '1' indicates a measurement result that the measurement gap is requested but the measurement is not performed in the measurement gap, and a bit '0' indicates a measurement result that the measurement gap is requested and the measurement is performed in the measurement gap or the measurement gap is not requested. A network device can predict, based on the information, measurement results of which PRSs can meet the positioning demand.

S860. Perform a predetermined operation, where the predetermined operation includes at least one of the following:

(1) sending a BWP activation request to the base station, for requesting to perform measurement on the downlink positioning reference signal in a newly activated BWP; or (2) sending BWP activation request confirmation signaling to the location server, where the BWP activation request confirmation signaling is used to indicate whether the terminal sends the BWP activation request to the base station.

Through the setting of S860, when the base station does not configure the measurement gap, the terminal can perform measurement on the downlink positioning reference signal in the newly activated BWP, thereby implementing measurement on the downlink positioning reference signal normally while ensuring accuracy of the measurement result.

It should be noted that, in the measurement method provided above, after the measurement gap gap request is sent to the base station, if the measurement gap is not configured, the terminal is not required and/or expected to process the downlink positioning reference signal. In some embodiments, the terminal is not required/expected to process the downlink positioning reference signal only when the terminal requests the measurement gap and the measurement gap is not configured. To be specific, when the terminal does not request the measurement gap, the terminal is required/expected to process the downlink positioning reference signal, and/or when the terminal requests the measurement gap and the measurement gap is configured, the terminal is required/expected to process the downlink positioning reference signal. In some embodiments, in English, the foregoing may be expressed as "UE is not expected/required to process DL PRS only if the measurement gap is requested by the UE and the gap is not configured".

It should be noted that the measurement methods 700 and 800 provided in the embodiments of this application may be performed by a measurement apparatus, or a control module configured to perform the measurement method 700 or 800 in the measurement apparatus. In the embodiments of this application, assuming that the measurement apparatus performs the measurement methods, the measurement apparatus provided in the embodiments of this application is described.

Figure 9A:
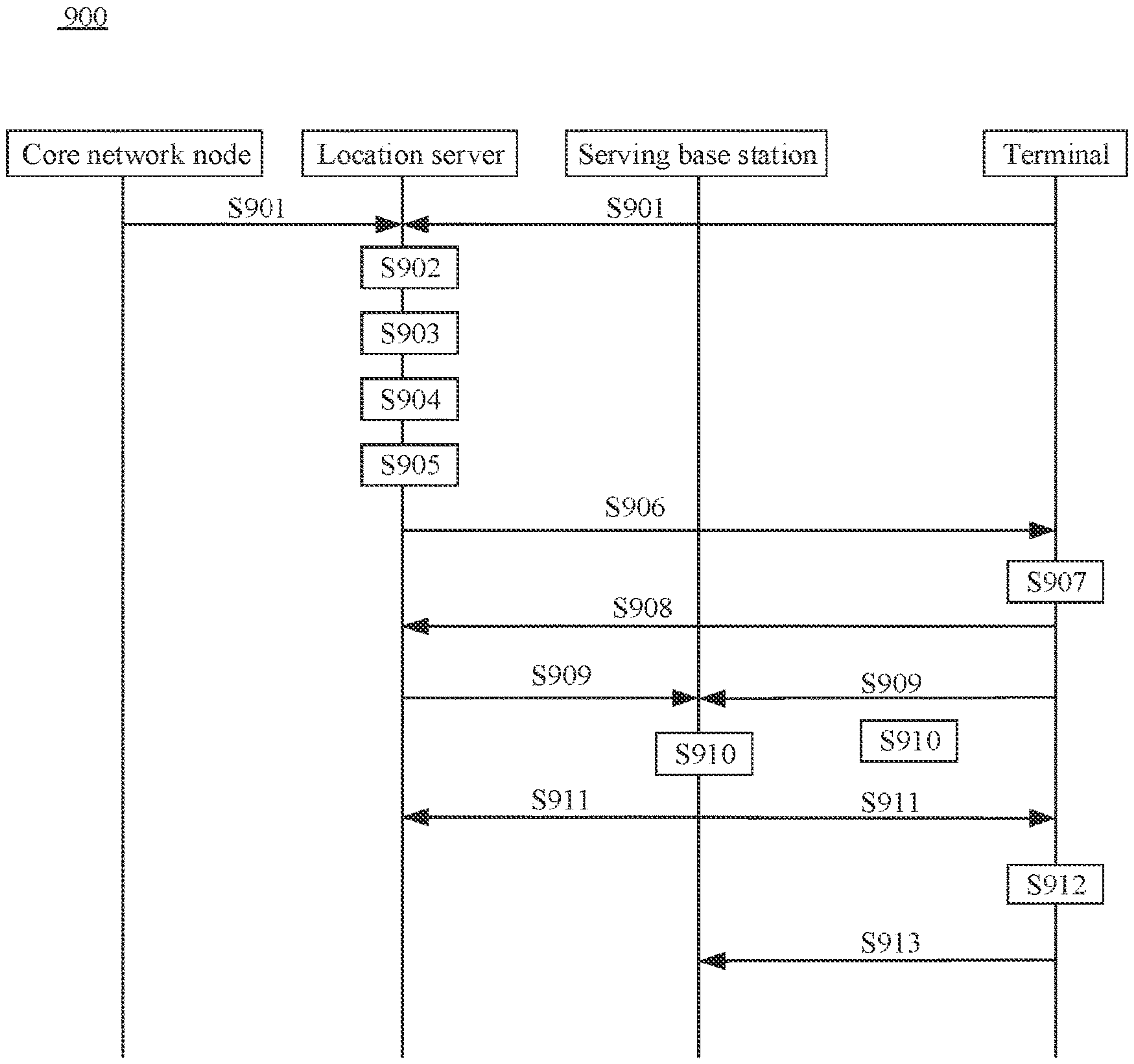
FIG. 9*a* is a schematic interaction flowchart of a measurement method according to an exemplary embodiment of this application.
Figure 9B:
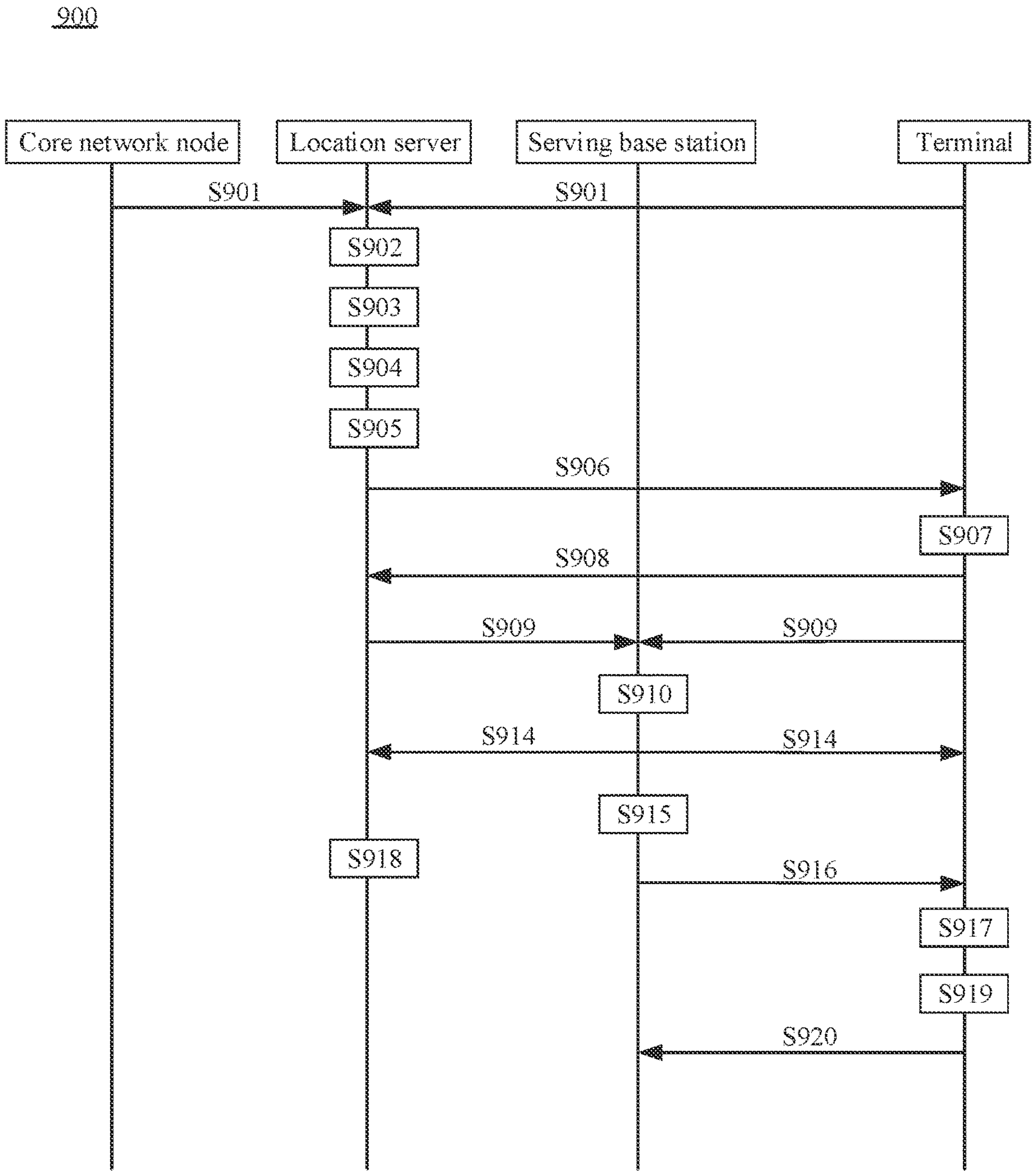
FIG. 9*b* is a schematic interaction flowchart of a measurement method according to another exemplary embodiment of this application.

FIG. 9*a* and FIG. 9*b* are schematic flowcharts of measurement methods according to an exemplary embodiment of this application. The method may include the following steps.

S901. A terminal or a network node such as a core network node sends an on-demand positioning request to a location server.

S902. The location server obtains capability information of the terminal.

S903. The location server obtains the capability information of the terminal.

S904. The location server determines current downlink positioning reference signal configuration information of the terminal based on the capability information of the terminal.

S905. The location server determines a measurement gap configuration required by the terminal to perform measurement on a target positioning service.

S906. The location server sends preset signaling to the terminal.

S907. The terminal determines whether a measurement gap is required.

S908. The terminal sends a feedback indication to the location server.

S909. The location server sends a measurement gap request to a base station, and/or the terminal sends a measurement gap request to the base station.

S910. The base station determines whether to configure the measurement gap.

(1) Referring to FIG. 9*a* again, in a case that the base station configures the measurement gap, the following process is performed:

S911. Configure the measurement gap, and send the measurement gap configuration and feedback information to the terminal and/or the positioning server.

S912. The terminal performs measurement on a downlink positioning reference signal.

S913. The terminal sends a measurement result to the location server.

(2) Referring to FIG. 9*b* again, in a case that the base station does not configure the measurement gap, the following process is performed:

S914. Send, to the terminal and/or the location server, feedback information for indicating that the base station does not configure the measurement gap.

S915. The base station triggers a target BWP activation procedure.

S916. The base station sends target BWP activation signaling to the terminal, and/or sends the current downlink positioning reference signal configuration information to the terminal and/or a positioning base station participating in a downlink positioning reference signal positioning service.

S917. Switch to a target BWP.

S918. The location server performs a predetermined operation. For the predetermined operation, refer to the related description in S860.

S919. The terminal performs measurement on a downlink positioning reference signal.

S920. The terminal sends a measurement result to the location server.

It may be understood that the data interaction process between the terminal, the location server, the base station, and the positioning base station is not shown in the foregoing measurement process. For details, refer to the description in the foregoing method embodiment. Details are not described herein again. In addition, when the terminal performs an actual positioning measurement, the measurement process may include but is not limited to the foregoing steps, for example, may have more or fewer steps than the foregoing process.

Further, in the measurement gap configuration request methods 200 to 600 or measurement methods 700 and 800 provided in the foregoing embodiments, the base station and the location server are used as independent devices to perform the corresponding methods. In addition, the location server may be integrated with the base station, or the location server or the like may be integrated in the base station, to perform one or more steps in the foregoing method and achieve corresponding technical effects.

For example, herein assuming that the location server is integrated in the base station, the measurement gap configuration request method may include the following implementation process.

(1) The base station receives an on-demand positioning request sent by a terminal, a core network node, or the like.

(2) In some embodiments, the terminal may determine expected downlink positioning reference signal configuration information, and send the expected downlink positioning reference signal configuration information to the base station.

(3) In some embodiments, the terminal may further determine whether a measurement gap is required, and if the measurement gap is required, the terminal sends a measurement gap request to the base station.

(4) In some embodiments, the base station may determine, according to the received measurement gap request, whether to configure the measurement gap, and determine, according to the measurement gap request and the downlink positioning reference signal configuration information expected by the terminal, new downlink positioning reference signal configuration information and a positioning base station participating in positioning, or if steps (2) and (3) are not performed, the base station may determine, according to the received positioning request, the downlink positioning reference signal configuration information and the positioning base station participating in the positioning.

(5) The base station sends the determined downlink positioning reference signal configuration information to the terminal and the positioning base station participating in the positioning.

(6) The terminal performs a positioning measurement based on the received downlink positioning reference signal configuration information.

It may be understood that, for the related descriptions of the foregoing (1) to (6), reference may be made to the detailed descriptions in the foregoing method embodiments. Details are not described herein again in this embodiment. In addition, the measurement gap configuration request method performed by the base station may include but is not limited to the procedure described in the foregoing (1) to (6).

Further, in the embodiments provided above, the signaling between the location server and the terminal may include at least one of a combination of LTE Positioning Protocol (LPP), NRPP, or LPPa signaling and (signaling between the base station and the terminal), or a combination of NRPPa signaling and (signaling between the base station and the terminal).

The signaling between the base station and the terminal may include at least one of Radio Resource Control (RRC), a Medium Access Control-Control Element (MAC CE), Downlink Control Information (DCI), a message 1 (Msg1), a message 3 (Msg3), broadcast signaling, or a paging message (Paging).

The signaling between the base station and the location server may include at least one of LPPa or NRPPa.

It may be understood that, for actual sending and receiving processes of the foregoing signaling, reference may be made to the related art. Details are not described in this embodiment.

Figure 10:
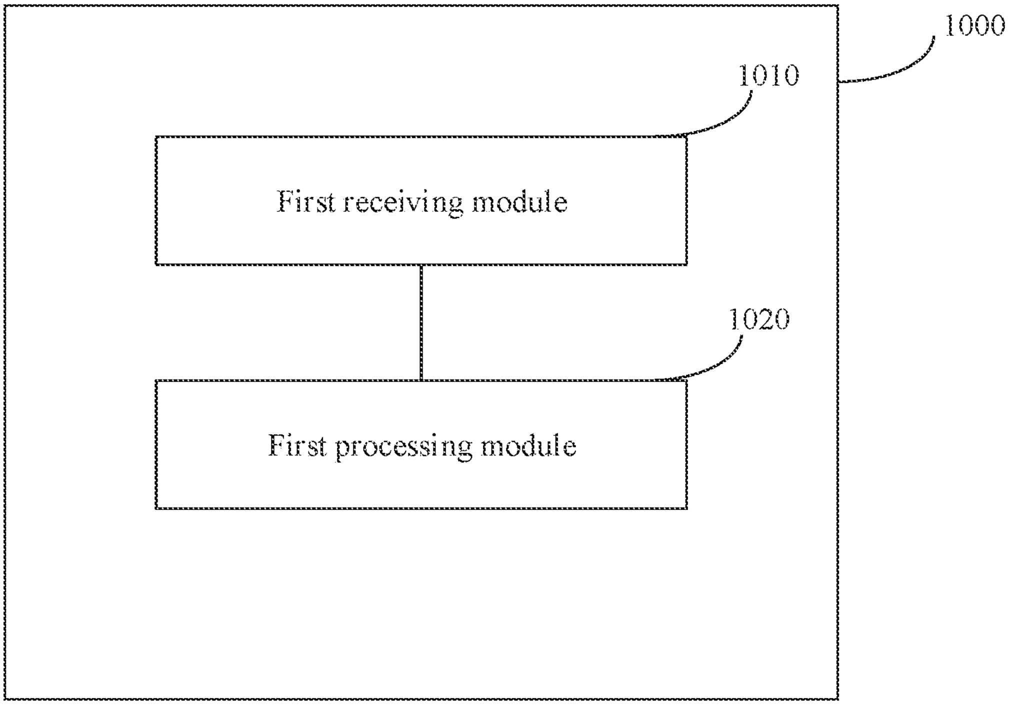
FIG. 10 is a schematic diagram of a block structure of a measurement gap configuration request apparatus according to an exemplary embodiment of this application.

FIG. 10 is a schematic diagram of a block structure of a measurement gap configuration apparatus 1000 according to an exemplary embodiment of this application. The apparatus 1000 may be a base station, or may be located in the base station. Referring to FIG. 10 again, the apparatus 1000 includes: a first receiving module 1010, configured to receive a measurement gap request sent by a terminal and/or a location server; and a first processing module 1020, configured to perform at least one of the following according to the measurement gap request: configuring a measurement gap for measurement on a downlink positioning reference signal, or sending feedback information to the terminal and/or the location server, where the feedback information is used to indicate whether the base station configures the measurement gap for measurement on the downlink positioning reference signal.

In one or more embodiments of this application, the measurement gap request includes at least one of the following content: gap confirmation information, used to instruct the base station to confirm whether the measurement gap is configurable; gap feedback information, used to instruct the base station to feed back to the terminal and/or the location server whether the measurement gap is configurable; a gap request, used to indicate to the base station that the terminal is to use the measurement gap to perform measurement on the downlink positioning reference signal; measurement frequency information, used to indicate frequency information by which the terminal performs measurement on the downlink positioning reference signal using the measurement gap; requested measurement gap configuration information; a start time of the measurement gap; an end time of the measurement gap; effective duration of the measurement gap; at least part of configuration information of the downlink positioning reference signal; priority information, used to indicate a priority of measurement on the downlink positioning reference signal or a location service in the measurement gap; or a bandwidth part (BWP) activation request, used to indicate the base station to activate a BWP in a case that the measurement gap being unconfigurable is determined, so as to perform measurement on the downlink positioning reference signal in the activated BWP.

In one or more embodiments of this application, that the processing module sends feedback information to the terminal and/or the location server includes: if the measurement gap configuration is not configured, sending the feedback information to the terminal and/or the location server, where the feedback information indicates that the measurement gap is not configured.

In one or more embodiments of this application, the feedback information further includes at least one of the following: an identifier of the downlink positioning reference signal for which the measurement gap is not configured; configuration information of the measurement gap that is not configured; at least part of information in downlink BWP configuration information; recommended measurement gap configuration information; recommended downlink positioning reference signal configuration information; BWP activation request indication signaling, used to instruct or trigger the terminal to initiate a BWP activation procedure and perform measurement on the downlink positioning reference signal in a newly activated BWP; or a cause for not configuring the measurement gap.

In one or more embodiments of this application, the BWP activation request indication signaling is further used to indicate configuration information of the activated BWP.

In one or more embodiments of this application, the first processing module 1020 is configured to: if the measurement gap is not configured, trigger a target BWP activation procedure, and send signaling for activating a target BWP to the terminal, where the target BWP is a positioning BWP or a new BWP other than a downlink BWP currently activated by the terminal and is used by the terminal to perform measurement on the downlink positioning reference signal in the target BWP.

In one or more embodiments of this application, that the first processing module 1020 sends feedback information to the terminal and/or the location server includes: if the measurement gap is configured, sending the feedback information to the terminal and/or the location server, where the feedback information indicates that the measurement gap is configured.

Figure 11A:
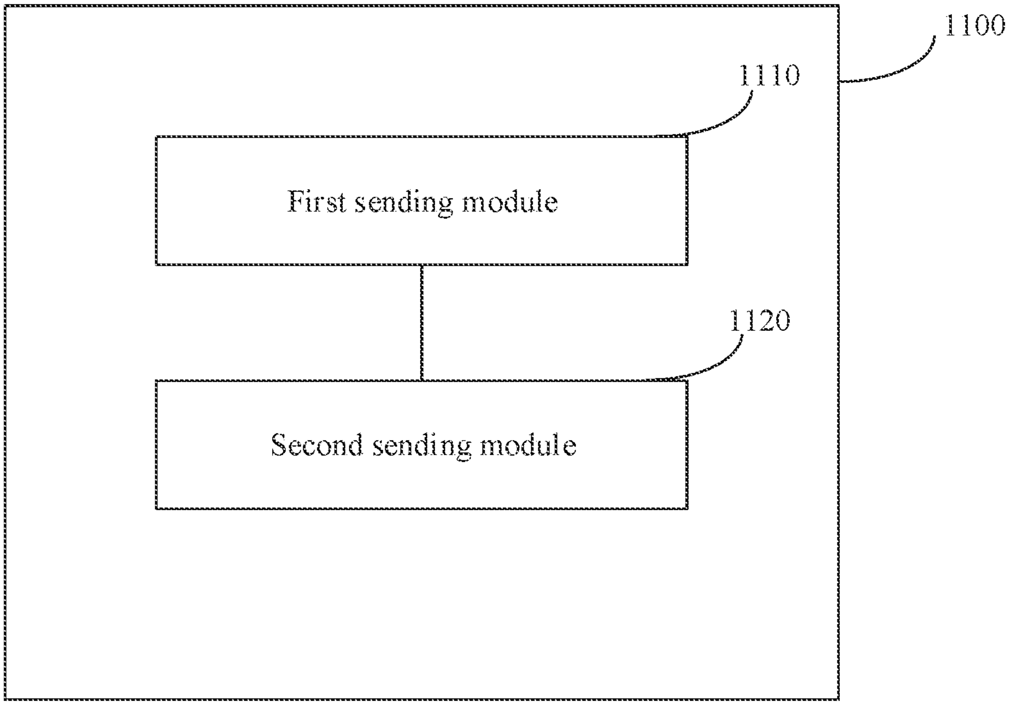
FIG. 11*a* is a schematic diagram of a block structure of a measurement gap configuration request apparatus according to an exemplary embodiment of this application.

FIG. 11*a* is a schematic diagram of a block structure of a measurement gap configuration apparatus 1100 according to an exemplary embodiment of this application. The apparatus 1100 may be a location server, or may be located in the location server. Referring to FIG. 11*a*, the apparatus 1100 includes: a first sending module 1110, configured to send preset signaling to a terminal, where the preset signaling includes at least part of information in current downlink positioning reference signal configuration information; and a second sending module 1120, configured to send a measurement gap request to a base station serving the terminal, where the measurement gap request is used to indicate the base station to configure a measurement gap for measurement on a downlink positioning reference signal.

In one or more embodiments of this application, the measurement gap request includes at least one of the following content: gap confirmation information, used to instruct the base station to confirm whether the measurement gap is configurable; gap feedback information, used to instruct the base station to feed back to the terminal and/or the location server whether the measurement gap is configurable; a gap request, used to indicate to the base station that the terminal is to use the measurement gap to perform measurement on the downlink positioning reference signal; measurement frequency information, used to indicate frequency information by which the terminal performs measurement on the downlink positioning reference signal using the measurement gap; requested measurement gap configuration information; a start time of the measurement gap; an end time of the measurement gap; effective duration of the measurement gap; at least part of configuration information of the downlink positioning reference signal; priority information, used to indicate a priority of measurement on the downlink positioning reference signal or a location service in the measurement gap; or bandwidth part BWP activation information, used to instruct the base station to activate a BWP in a case that the measurement gap being unconfigurable is determined, so as to perform measurement on the downlink positioning reference signal in the activated BWP.

In one or more embodiments of this application, the preset signaling is further used to request the terminal to determine whether to request the measurement gap, and/or the preset signaling is used to request at least one of configuration information of the measurement gap, frequency information for performing the measurement, or identification information of the downlink positioning reference signal associated with the measurement gap expected by the terminal.

Figure 11B:
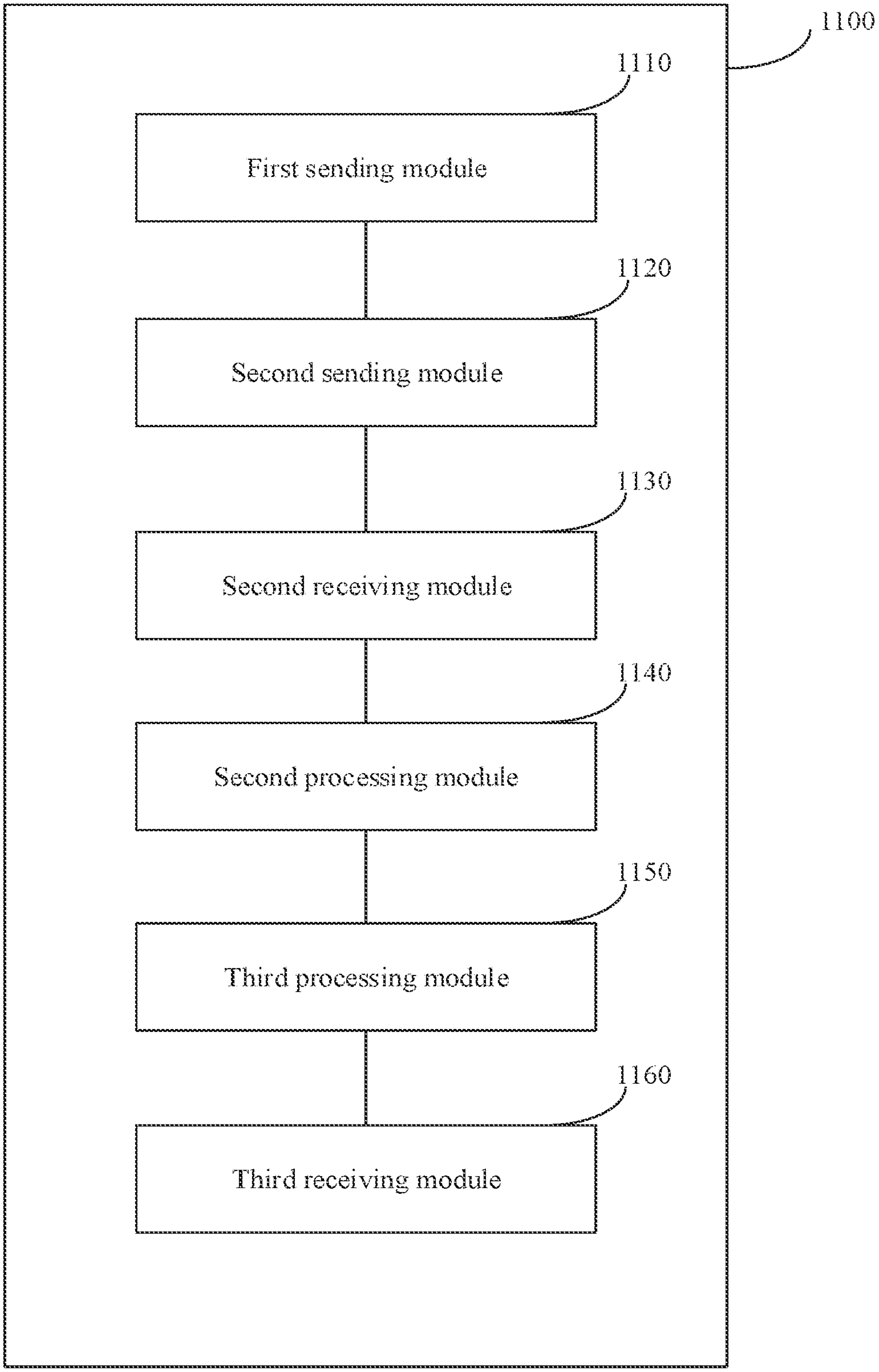
FIG. 11*b* is a schematic diagram of a block structure of a measurement gap configuration request apparatus according to another exemplary embodiment of this application.

In one or more embodiments of this application, referring to FIG. 11*b*, the apparatus further includes a second receiving module 1310, configured to receive feedback information sent by the base station, and/or receive feedback information forwarded by the terminal, where the feedback information is used to indicate whether the base station configures the measurement gap.

In one or more embodiments of this application, referring to FIG. 11*b*, the apparatus further includes a second processing module 1140, configured to perform at least one of the following if the feedback information indicates that the base station does not configure the measurement gap: determining new downlink positioning reference signal configuration information, where the new downlink positioning reference signal configuration information includes downlink positioning reference signal configuration information before the current downlink positioning reference signal configuration information of the terminal, or downlink positioning reference signal configuration information by updating the current downlink positioning reference signal configuration information based on the feedback information; sending the new downlink positioning reference signal configuration information to the terminal and/or a positioning base station that participates in a downlink positioning reference signal positioning service; adjusting a preset positioning demand and/or a performance indicator of the terminal, and sending an adjusted positioning demand and/or an adjusted performance indicator of the terminal to an upper-layer network node; sending, to the upper-layer network node, information indicating inability to meet the preset positioning demand and a cause for the inability to meet the preset positioning demand; or sending a BWP activation request to the base station.

In one or more embodiments of this application, the BWP activation request includes BWP configuration information expected by the terminal.

In one or more embodiments of this application, the feedback information includes at least one of the following: an identifier of the downlink positioning reference signal for which the measurement gap is not configured; configuration information of the measurement gap that is not configured; at least part of information in downlink BWP configuration information; recommended measurement gap configuration information; recommended downlink positioning reference signal configuration information; BWP activation request indication signaling, used to instruct or trigger the terminal to initiate a BWP activation procedure and perform measurement on the downlink positioning reference signal in a newly activated BWP; or a cause for not configuring the measurement gap.

In one or more embodiments of this application, the second processing module 1140 is further configured to: if the feedback information indicates that the base station does not configure the measurement gap, send the current downlink positioning reference signal configuration information to the terminal and/or the positioning base station that participates in the downlink positioning reference signal positioning service.

In one or more embodiments of this application, referring to FIG. 11*b*, the apparatus further includes a third processing module 1150, configured to perform at least one of the following: obtaining capability information of the terminal in a case that an on-demand positioning request for the terminal is received; determining the current downlink positioning reference signal configuration information of the terminal based on the capability information of the terminal and/or the on-demand positioning request; or determining the measurement gap configuration required by the terminal to perform measurement on a target positioning service, where the target positioning service is a positioning service corresponding to the current downlink positioning reference signal configuration information.

In one or more embodiments of this application, that the third processing module 1150 determines the measurement gap configuration required by the terminal to perform measurement on a target positioning service includes: receiving BWP configuration information of the terminal that is sent by the terminal and/or the base station; and determining, based on the BWP configuration information and the current downlink positioning reference signal configuration information, the measurement gap required by the terminal to perform measurement on the positioning service corresponding to the current downlink positioning reference signal configuration information.

In one or more embodiments of this application, after the preset signaling is sent to the terminal, referring to FIG. 11*b*, the apparatus further includes a third receiving module 1160, configured to receive a feedback indication returned by the terminal, where the feedback indication is used to indicate whether the terminal requests the measurement gap.

In one or more embodiments of this application, the third receiving module is further configured to: if the feedback indication indicates that the terminal requests the measurement gap, wait for the terminal or the base station to feed back feedback signaling about whether the measurement gap is configured.

Figure 12:
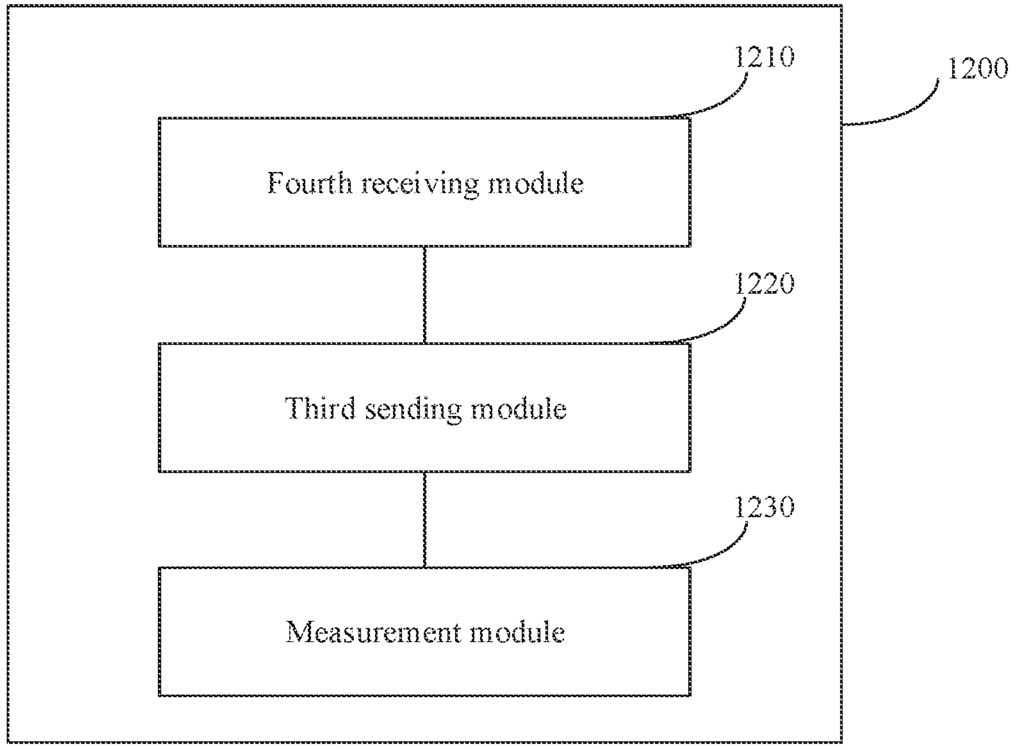
FIG. 12 is a schematic diagram of a block structure of a measurement apparatus according to an exemplary embodiment of this application.

FIG. 12 is a schematic diagram of a block structure of a measurement apparatus 1200 according to an exemplary embodiment of this application. The apparatus 1200 may be a terminal, or may be located in the terminal. Referring to FIG. 12 again, the apparatus includes: a fourth receiving module 1210, configured to receive preset signaling sent by a location server, where the preset signaling includes at least part of information in current downlink positioning reference signal configuration information; a third sending module 1220, configured to send a measurement gap request to a base station according to the preset signaling, where the measurement gap request is used to indicate the base station to configure a measurement gap for measurement on a downlink positioning reference signal; and a measurement module 1230, configured to perform measurement on the downlink positioning reference signal according to whether the measurement gap is configured and/or the preset signaling.

In one or more embodiments of this application, the measurement gap request includes at least one of the following content: gap confirmation information, used to instruct the base station to confirm whether the measurement gap is configurable; gap feedback information, used to instruct the base station to feed back to the terminal and/or the location server whether the measurement gap is configurable; a gap request, used to indicate to the base station that the terminal is to use the measurement gap to perform measurement on the downlink positioning reference signal; measurement frequency information, used to indicate frequency information by which the terminal performs measurement on the downlink positioning reference signal using the measurement gap; requested measurement gap configuration information; a start time of the measurement gap; an end time of the measurement gap; effective duration of the measurement gap; at least part of configuration information of the downlink positioning reference signal; priority information, used to indicate a priority of measurement on the downlink positioning reference signal or a location service in the measurement gap; or a bandwidth part BWP activation request, used to indicate the base station to activate a BWP in a case that the measurement gap being unconfigurable is determined, so as to perform measurement on the downlink positioning reference signal in the activated BWP.

In one or more embodiments of this application, the preset signaling is further used to request the terminal to feed back whether to request the measurement gap, and/or the preset signaling is used to request at least one of configuration information of the measurement gap, frequency information for performing the measurement, or identification information of the downlink positioning reference signal associated with the measurement gap expected by the terminal.

In one or more embodiments of this application, the fourth receiving module 1210 is further configured to receive feedback information sent by the base station, where the feedback information is used to indicate whether the base station configures the measurement gap.

In one or more embodiments of this application, the third sending module 1220 is further configured to: if it is detected that the measurement gap configuration is not received, or the feedback information sent by the base station indicates that the measurement gap is not configured, perform at least one of the following: sending a BWP activation request to the base station, for requesting to perform measurement on the downlink positioning reference signal in a newly activated BWP; or sending BWP activation request confirmation signaling to the location server, where the BWP activation request confirmation signaling is used to indicate whether the terminal sends the BWP activation request to the base station.

In one or more embodiments of this application, the feedback information further includes at least one of the following: an identifier of the downlink positioning reference signal for which the measurement gap is not configured; configuration information of the measurement gap that is not configured; at least part of information in downlink BWP configuration information; recommended measurement gap configuration information; recommended downlink positioning reference signal configuration information; BWP activation request indication signaling, used to instruct or trigger the terminal to initiate a BWP activation procedure and perform measurement on the downlink positioning reference signal in a newly activated BWP; or a cause for not configuring the measurement gap.

In one or more embodiments of this application, in a case that the BWP activation request indication signaling indicates that the base station triggers BWP switching, the measurement module 1230 is further configured to switch to a target BWP, where the target BWP is a positioning BWP or a new BWP other than a downlink BWP currently activated by the terminal.

In one or more embodiments of this application, the third sending module 1220 is further configured to send a feedback indication to the location server, where the feedback indication is used to indicate whether the terminal requests the measurement gap.

In one or more embodiments of this application, the feedback indication is used to indicate at least one of the following: whether the terminal sends the measurement gap request to the base station; a cause for whether the terminal sends the measurement gap request to the base station; or an identifier of the downlink positioning reference signal associated with the measurement gap request.

In one or more embodiments of this application, the third sending module 1220 is further configured to send a measurement result of the downlink positioning reference signal to the location server, where the measurement result of the downlink positioning reference signal includes at least one of the following information: the measurement result of the downlink positioning reference signal; whether the downlink positioning reference signal is measured in the measurement gap; whether the measurement gap request is sent to the base station; or the identifier of the associated downlink positioning reference signal.

In one or more embodiments of this application, after the measurement gap request is sent to the base station, if the measurement gap is not configured, the terminal is not required and/or expected to process the downlink positioning reference signal.

The measurement apparatus 1200 in this embodiment of this application may be an apparatus, or may be a component, an integrated circuit, or a chip in a terminal. The apparatus may be a mobile terminal, or may be a nonmobile terminal. For example, the mobile terminal may include but is not limited to the foregoing illustrated type of the terminal 11. The nonmobile terminal may be a server, a Network Attached Storage (NAS), a personal computer (PC), a television (TV), a teller machine, a self-service machine, or the like. This is not specifically limited in this embodiment of this application.

The measurement apparatus 1200 in this embodiment of this application may be an apparatus having an operating system. The operating system may be an Android operating system, may be an iOS operating system, or may be another possible operating system, which is not specifically limited in the embodiments of this application.

The measurement apparatus 1200 provided in this embodiment of this application can implement each process implemented by the method embodiments in FIG. 7 and FIG. 8, with the same technical effect achieved. To avoid repetition, details are not described herein again.

Further, an embodiment of this application further provides a communications device, including a processor, a memory, and a program or instructions stored in the memory and capable of running on the processor. For example, when the communications device is a terminal, and the program or instructions are executed by the processor, each process of the foregoing measurement method embodiment is implemented, with the same technical effect achieved. When the communications device is a network-side device, and the program or instructions are executed by the processor, each process of the foregoing measurement gap configuration request method embodiment is implemented, with the same technical effect achieved. To avoid repetition, details are not described herein again.

Figure 13:
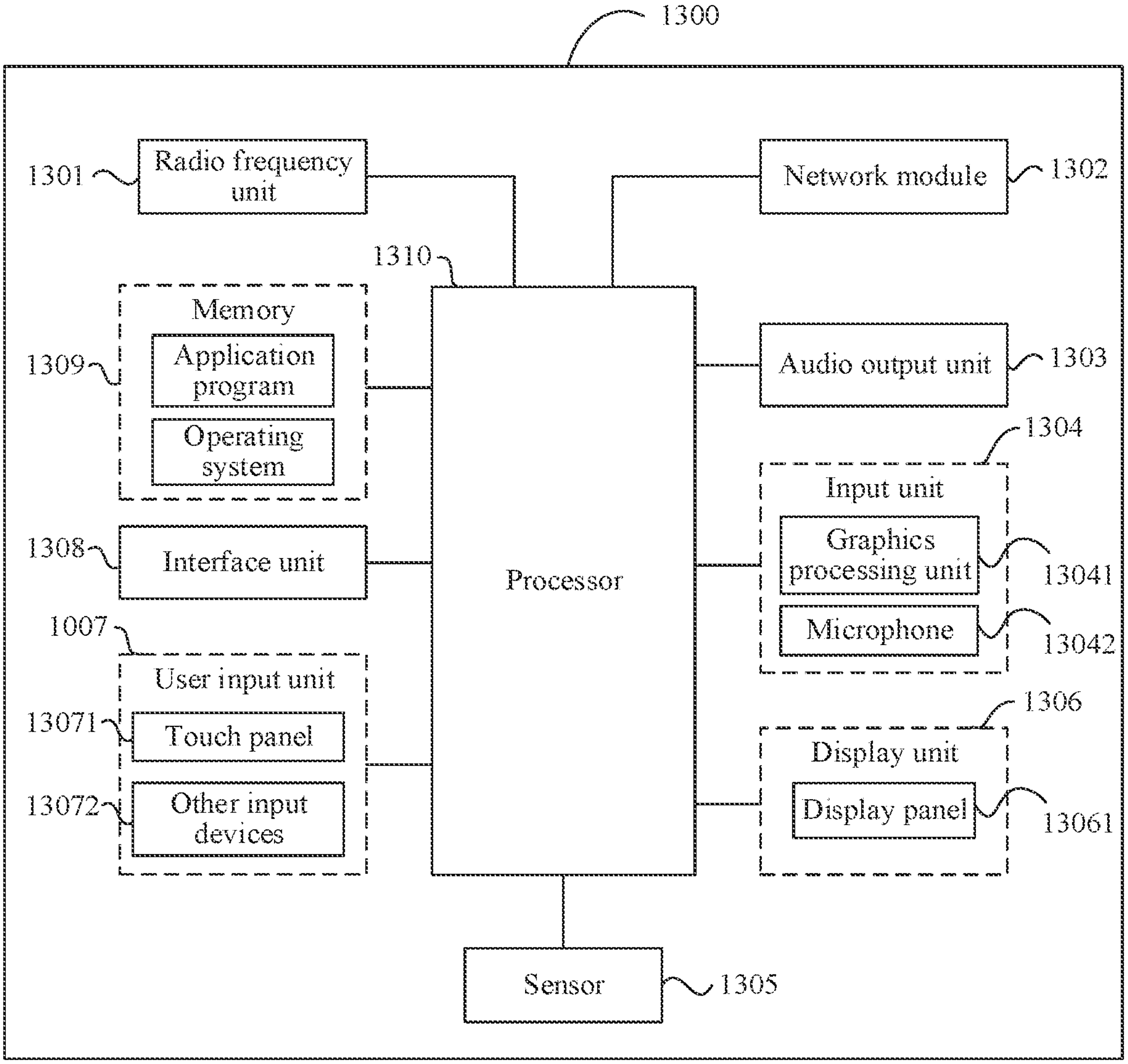
FIG. 13 is a schematic diagram of a block structure of a terminal according to an exemplary embodiment of this application.

In a possible implementation, FIG. 13 is a schematic diagram of a hardware structure of a terminal 1300 according to an exemplary embodiment of this application. The terminal 1300 includes but is not limited to components such as a radio frequency unit 1301, a network module 1302, an audio output unit 1303, an input unit 1304, a sensor 1305, a display unit 1306, a user input unit 1307, an interface unit 1308, a memory 1309, and a processor 1310.

A person skilled in the art can understand that the terminal 1300 may further include a power supply (such as a battery) for supplying power to the components. The power supply may be logically connected to the processor 1310 through a power management system. In this way, functions such as charge management, discharge management, and power consumption management are implemented by using the power management system. The structure of the terminal shown in FIG. 13 does not constitute any limitation on the terminal. The terminal may include more or fewer components than shown in the figure, or combine some of the components, or arrange the components differently. Details are not described herein again.

It should be understood that in this embodiment of this application, the input unit 1304 may include a Graphics Processing Unit (GPU) 13041 and a microphone 13042. The graphics processing unit 13041 processes image data of a static picture or a video that is obtained by an image capture apparatus (for example, a camera) in a video capture mode or an image capture mode. The display unit 1306 may include a display panel 13061, and the display panel 13061 may be configured in a form of a liquid crystal display, an organic light-emitting diode, or the like. The user input unit 1307 includes a touch panel 13071 and other input devices 13072. The touch panel 13071 is also referred to as a touchscreen. The touch panel 13071 may include two parts: a touch detection apparatus and a touch controller. The other input devices 13072 may include but are not limited to a physical keyboard, a functional button (such as a volume control button or a power on/off button), a trackball, a mouse, and a joystick. Details are not described herein again.

In this embodiment of this application, the radio frequency unit 1301 sends downlink data received from a network-side device to the processor 1310 for processing, and in addition, sends uplink data to the network-side device. Generally, the radio frequency unit 1301 includes but is not limited to an antenna, at least one amplifier, a transceiver, a coupler, a low noise amplifier, and a duplexer.

The memory 1309 may be configured to store software programs or instructions and various data. The memory 1309 may primarily include a program or instruction storage area and a data storage area. The program or instruction storage area may store an operating system, an application program or instructions (such as an audio play function and an image play function) required by at least one function, and the like. In addition, the memory 1309 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage device, a flash memory device, or other non-volatile solid-state storage devices.

The processor 1310 may include one or more processing units. In some embodiments, the processor 1310 may integrate an application processor and a modem processor. The application processor mainly processes the operating system, a user interface, an application program, or an instruction. The modem processor mainly processes wireless communication. For example, the modem processor is a baseband processor. It may be understood that the modem processor may not be integrated in the processor 1310.

The processor 1310 is configured to perform any one of the measurement gap configuration request methods 200, 300, 400, 500, or 600 described in the foregoing embodiments, or the processor 1310 is configured to perform either of the measurement methods 700 and 800 described in the foregoing embodiments, with the same technical effect achieved. To avoid repetition, details are not described herein again.

Figure 14:
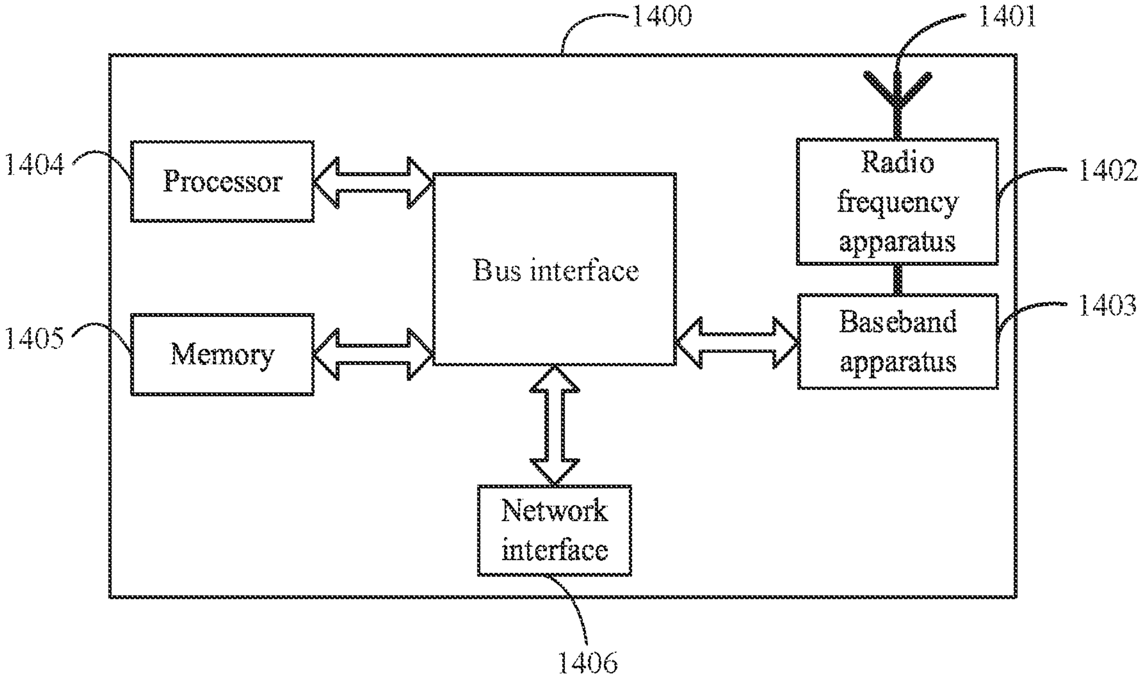
FIG. 14 is a schematic diagram of a block structure of a network-side device according to an exemplary embodiment of this application.

In another possible implementation, FIG. 14 is a schematic diagram of a structure of a network-side device according to an exemplary embodiment of this application. As shown in FIG. 14, the network-side device 1400 includes an antenna 1401, a radio frequency apparatus 1402, and a baseband apparatus 1403. The antenna 1401 is connected to the radio frequency apparatus 1402. In an uplink direction, the radio frequency apparatus 1402 receives information by using the antenna 1401, and sends the received information to the baseband apparatus 1403 for processing. In a downlink direction, the baseband apparatus 1403 processes to-be-sent information, and sends the information to the radio frequency apparatus 1402; and the radio frequency apparatus 1402 processes the received information and then sends the information by using the antenna 1401.

The frequency band processing apparatus may be located in the baseband apparatus 1403. The method performed by the network-side device in the foregoing embodiment may be implemented in the baseband apparatus 1403, and the baseband apparatus 1403 includes a processor 1404 and a memory 1405.

The baseband apparatus 1403 may include, for example, at least one baseband processing unit, where a plurality of chips are disposed on the baseband processing unit. As shown in FIG. 14, one of the chips is, for example, the processor 1404, and connected to the memory 1405, to invoke the program in the memory 1405 to perform the operations of the network-side device shown in the foregoing method embodiment.

The baseband apparatus 1403 may further include a network interface 1406, configured to exchange information with the radio frequency apparatus 1402, where the interface is, for example, a common public radio interface (CPRI).

The network-side device 1400 in this embodiment of the present application further includes a program or instructions stored in the memory 1405 and capable of running on the processor 1404. When the processor 1404 invokes the program or instructions in the memory 1405, the method performed by each module shown in FIG. 11*a*, FIG. 11*b*, or FIG. 12 is performed, with the same technical effect achieved. To avoid repetition, details are not described herein again.

It should be noted that the network-side device 1400 may be the base station described in this application, or may be a location server, or may be a network device integrating corresponding functions of the server and the location server. This is not limited in this embodiment.

An embodiment of this application further provides a readable storage medium. The readable storage medium stores a program or instructions. When the program or instructions are executed by a processor, each process of the foregoing measurement gap configuration request method embodiment and/or measurement method embodiment is implemented, with the same technical effect achieved. To avoid repetition, details are not described herein again.

The processor is a processor in the terminal in the foregoing embodiment. The readable storage medium includes a computer-readable storage medium, for example, a computer Read-Only Memory (ROM), a Random Access Memory (RAM), a magnetic disk, or an optical disc.

In addition, an embodiment of this application provides a chip. The chip includes a processor and a communications interface, where the communications interface is coupled to the processor, and the processor is configured to run a program or instructions on a network-side device to implement each process of the foregoing measurement gap configuration request method embodiment and/or measurement method embodiment, with the same technical effect achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "comprise", "include", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element preceded by the statement "includes a . . . " does not preclude the existence of other identical elements in the process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, a person skilled in the art may clearly understand that the method in the foregoing embodiments may be implemented by software with a necessary general hardware platform. The method in the foregoing embodiments may be implemented by hardware. Based on such an understanding, the technical solutions of this application essentially or a part thereof that contributes to the prior art may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific implementations. The foregoing specific implementations are merely illustrative rather than restrictive. As instructed by this application, a person of ordinary skill in the art may develop many other manners without departing from the essence of this application and the protection scope of the claims, and all such manners shall fall within the protection scope of this application.

What is claimed is:

1. A method for requesting a measurement gap configuration, performed by a base station, comprising:

receiving a measurement gap request sent by a location server through NRPPa signaling;

configuring a measurement gap for measurement on a downlink positioning reference signal to a terminal according to the measurement gap request; and sending feedback information to the location server, wherein the feedback information is used to indicate whether the base station configures the measurement gap for measurement on the downlink positioning reference signal for the terminal, wherein sending the feedback information to the location server comprises:

when the base station configures the measurement gap for the terminal, sending the feedback information to the location server, wherein the feedback information indicates that the measurement gap is configured.

2. The method according to claim 1, wherein the measurement gap request comprises at least one of the following:

gap confirmation information, used to instruct the base station to confirm whether the measurement gap is configurable;

gap feedback information, used to instruct the base station to feed back to the terminal or the location server whether the measurement gap is configurable;

a gap request, used to indicate to the base station that the terminal is to use the measurement gap to perform measurement on the downlink positioning reference signal;

measurement frequency information, used to indicate frequency information by which the terminal performs measurement on the downlink positioning reference signal using the measurement gap;

requested measurement gap configuration information;

a start time of the measurement gap;

an end time of the measurement gap;

effective duration of the measurement gap;

at least part of configuration information of the downlink positioning reference signal;

priority information, used to indicate a priority of measurement on the downlink positioning reference signal or a location service to be performed in the measurement gap; or bandwidth part (BWP) activation information, used to instruct the base station to activate a BWP when the measurement gap being unconfigurable is determined, so as to perform measurement on the downlink positioning reference signal in the activated BWP.

3. The method according to claim 1, wherein sending the feedback information to the terminal or the location server comprises one of the following:

when the measurement gap configuration is not configured, sending the feedback information to the terminal or the location server, wherein the feedback information indicates that the measurement gap is not configured;

when the measurement gap configuration is not configured, triggering a BWP activation procedure, and sending signaling for activating a target BWP to the terminal, wherein the target BWP is a positioning BWP or a new BWP other than a downlink BWP currently activated by the terminal; or sending the feedback information to the terminal or the location server, wherein the feedback information indicates that the measurement gap is configured.

4. The method according to claim 3, wherein the feedback information further comprises at least one of the following:

an identifier of the downlink positioning reference signal for which the measurement gap is not configured;

configuration information of the measurement gap that is not configured;

at least part of information in downlink BWP configuration information;

recommended measurement gap configuration information;

recommended downlink positioning reference signal configuration information;

BWP activation request indication signaling, used to instruct or trigger the terminal to initiate a BWP activation procedure and perform measurement on the downlink positioning reference signal in a newly activated BWP; or a cause for not configuring the measurement gap.

5. The method according to claim 4, wherein the BWP activation request indication signaling is further used to indicate configuration information of the activated BWP.

6. A method for requesting measurement gap configuration, performed by a location server, comprising:

sending, through NRPPa signaling, a measurement gap request to a base station serving a terminal, wherein the measurement gap request is used to instruct the base station to configure a measurement gap for measurement on a downlink positioning reference signal; and receiving feedback information sent by the base station, wherein the feedback information is used for indicating whether the base station configures the measurement gap to the terminal.

7. The method according to claim 6, wherein the measurement gap request comprises at least one of the following:

gap confirmation information, used to instruct the base station to confirm whether the measurement gap is configurable;

gap feedback information, used to instruct the base station to feed back to the terminal or the location server whether the measurement gap is configurable;

a gap request, used to indicate to the base station that the terminal is to use the measurement gap to perform measurement on the downlink positioning reference signal;

measurement frequency information, used to indicate frequency information by which the terminal performs measurement using the measurement gap;

requested measurement gap configuration information;

a start time of the measurement gap;

an end time of the measurement gap;

effective duration of the measurement gap;

at least part of configuration information of the downlink positioning reference signal;

priority information, used to indicate a priority of measurement on the downlink positioning reference signal or a location service in the measurement gap; or bandwidth part (BWP) activation information, used to instruct the base station to activate a BWP when the measurement gap being unconfigurable is determined, so as to perform measurement on the downlink positioning reference signal in the activated BWP.

8. The method according to claim 6, wherein after sending the measurement gap request to the base station serving the terminal, the method further comprises:

receiving feedback information sent by the base station, or receiving feedback information forwarded by the terminal, wherein the feedback information is used to indicate whether the base station configures the measurement gap.

9. The method according to claim 8, wherein after receiving the feedback information sent by the base station or the terminal, the method further comprises:

when the feedback information indicates that the base station does not configure the measurement gap, performing at least one of the following:

determining new downlink positioning reference signal configuration information, wherein the new downlink positioning reference signal configuration information comprises downlink positioning reference signal configuration information before current downlink positioning reference signal configuration information of the terminal, or downlink positioning reference signal configuration information by updating the current downlink positioning reference signal configuration information based on the feedback information;

sending the new downlink positioning reference signal configuration information to the terminal or a positioning base station that participates in a downlink positioning reference signal positioning service;

adjusting a preset positioning demand or a performance indicator of the terminal, and sending an adjusted positioning demand or an adjusted performance indicator of the terminal to an upper-layer network node;

sending, to the upper-layer network node, information indicating inability to meet the preset positioning demand and a cause for the inability to meet the preset positioning demand; or sending a BWP activation request to the base station, wherein the BWP activation request comprises BWP configuration information expected by the terminal, wherein the feedback information comprises at least one of the following:

an identifier of the downlink positioning reference signal for which the measurement gap is not configured;

configuration information of the measurement gap that is not configured;

at least part of information in downlink BWP configuration information;

recommended measurement gap configuration information;

recommended downlink positioning reference signal configuration information;

BWP activation request indication signaling, used to instruct or trigger the terminal to initiate a BWP activation procedure and perform measurement on the downlink positioning reference signal in a newly activated BWP; or a cause for not configuring the measurement gap.

10. The method according to claim 9, wherein after receiving the feedback information sent by the base station, the method further comprises:

when the feedback information indicates that the base station does not configure the measurement gap, sending the current downlink positioning reference signal configuration information to the terminal or the positioning base station that participates in the downlink positioning reference signal positioning service.

11. The method according to claim 6, further comprising at least one of the following:

obtaining capability information of the terminal when an on-demand positioning request for the terminal is received;

determining current downlink positioning reference signal configuration information of the terminal based on the capability information of the terminal or the on-demand positioning request; or determining the measurement gap configuration required by the terminal to perform measurement on a target positioning service, wherein the target positioning service is a positioning service corresponding to the current downlink positioning reference signal configuration information.

12. A base station, comprising a processor and a memory storing a program or an instruction that is capable of running on the processor, wherein the program or the instruction, when executed by the processor, causes the base station to perform operations comprising:

receiving a measurement gap request sent by a location server through NRPPa signaling;

configuring a measurement gap for measurement on a downlink positioning reference signal to a terminal according to the measurement gap request; and sending feedback information to the location server, wherein the feedback information is used to indicate whether the base station configures the measurement gap for measurement on the downlink positioning reference signal for the terminal, wherein sending the feedback information to the location server comprises:

when the base station configures the measurement gap for the terminal, sending the feedback information to the location server, wherein the feedback information indicates that the measurement gap is configured.

13. The base station according to claim 12, wherein the measurement gap request comprises at least one of the following:

gap confirmation information, used to instruct the base station to confirm whether the measurement gap is configurable;

gap feedback information, used to instruct the base station to feed back to the terminal or the location server whether the measurement gap is configurable;

a gap request, used to indicate to the base station that the terminal is to use the measurement gap to perform measurement on the downlink positioning reference signal;

measurement frequency information, used to indicate frequency information by which the terminal performs measurement on the downlink positioning reference signal using the measurement gap;

requested measurement gap configuration information;

a start time of the measurement gap;

an end time of the measurement gap;

effective duration of the measurement gap;

at least part of configuration information of the downlink positioning reference signal;

priority information, used to indicate a priority of measurement on the downlink positioning reference signal or a location service to be performed in the measurement gap; or bandwidth part (BWP) activation information, used to instruct the base station to activate a BWP when the measurement gap being unconfigurable is determined, so as to perform measurement on the downlink positioning reference signal in the activated BWP.

14. The base station according to claim 12, wherein sending the feedback information to the terminal or the location server comprises one of the following:

when the measurement gap configuration is not configured, sending the feedback information to the terminal or the location server, wherein the feedback information indicates that the measurement gap is not configured;

when the measurement gap configuration is not configured, triggering a BWP activation procedure, and sending signaling for activating a target BWP to the terminal, wherein the target BWP is a positioning BWP or a new BWP other than a downlink BWP currently activated by the terminal; or sending the feedback information to the terminal or the location server, wherein the feedback information indicates that the measurement gap is configured.

15. The base station according to claim 14, wherein the feedback information further comprises at least one of the following:

an identifier of the downlink positioning reference signal for which the measurement gap is not configured;

configuration information of the measurement gap that is not configured;

at least part of information in downlink BWP configuration information;

recommended measurement gap configuration information;

recommended downlink positioning reference signal configuration information;

BWP activation request indication signaling, used to instruct or trigger the terminal to initiate a BWP activation procedure and perform measurement on the downlink positioning reference signal in a newly activated BWP; or a cause for not configuring the measurement gap.

16. The base station according to claim 15, wherein the BWP activation request indication signaling is further used to indicate configuration information of the activated BWP.

* * * * *